US012411636B2

(12) United States Patent
Park et al.

(10) Patent No.: US 12,411,636 B2
(45) Date of Patent: Sep. 9, 2025

(54) STORAGE DEVICE AND METHOD TO CHECK STATUSES OF MEMORY DEVICES

(71) Applicant: SAMSUNG ELECTRONICS CO., LTD., Suwon-si (KR)

(72) Inventors: Tae-Eun Park, Suwon-si (KR); Suhyun Kim, Suwon-si (KR); Hyunsook Lee, Suwon-si (KR); Haejong Jang, Suwon-si (KR); Seonghoon Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/230,453

(22) Filed: Aug. 4, 2023

(65) Prior Publication Data
US 2024/0248643 A1 Jul. 25, 2024

(30) Foreign Application Priority Data

Jan. 25, 2023 (KR) .................... 10-2023-0009629

(51) Int. Cl.
G06F 3/06 (2006.01)
(52) U.S. Cl.
CPC .......... *G06F 3/0659* (2013.01); *G06F 3/0683* (2013.01); *G06F 3/0604* (2013.01)
(58) Field of Classification Search
CPC ..... G06F 3/0659; G06F 3/0683; G06F 3/0604
USPC ...................................................... 711/154
See application file for complete search history.

(56) References Cited

U.S. PATENT DOCUMENTS

| 8,429,313 B2 | 4/2013 | Smith et al. |
| 10,346,087 B2 | 7/2019 | Woo et al. |
| 11,003,382 B2 | 5/2021 | Woo et al. |
| 2005/0268025 A1 | 12/2005 | Smith et al. |
| 2013/0339555 A1* | 12/2013 | Schushan ............ G06F 11/3037 710/19 |
| 2018/0018128 A1* | 1/2018 | Kang .................... G06F 3/0625 |
| 2018/0052639 A1 | 2/2018 | Woo et al. |
| 2019/0324679 A1 | 10/2019 | Woo et al. |
| 2021/0294517 A1 | 9/2021 | Woo et al. |
| 2022/0011959 A1 | 1/2022 | Srinivasan et al. |
| 2022/0317932 A1 | 10/2022 | Sugahara et al. |
| 2022/0382486 A1* | 12/2022 | Kim ....................... G06F 3/061 |
| 2023/0045463 A1* | 2/2023 | Kim ...................... G06F 3/0688 |
| 2024/0036753 A1* | 2/2024 | Chin ..................... G06F 3/0604 |

FOREIGN PATENT DOCUMENTS

| KR | 10-1182597 B1 | 9/2012 |
| KR | 10-1735150 B1 | 5/2017 |
| KR | 10-2018-0019418 A | 2/2018 |

* cited by examiner

*Primary Examiner* — Than Nguyen
(74) *Attorney, Agent, or Firm* — Sughrue Mion, PLLC

(57) ABSTRACT

A storage device is provided. The storage device includes: a plurality of memory devices configured to output status data indicating a busy state indicating an internal operation is being performed or a ready state; and an interface circuit configured to receive a command for reading the status data of the plurality of memory devices, receive the status data of each of the plurality of memory devices from the plurality of memory devices, and output entire status data indicating statuses of the plurality of memory devices based on the status data of each of the plurality of memory devices.

17 Claims, 12 Drawing Sheets

STORAGE DEVICE AND METHOD TO CHECK STATUSES OF MEMORY DEVICES

CROSS-REFERENCE TO RELATED APPLICATION

This application claims priority to Korean Patent Application No. 10-2023-0009629, filed in the Korean Intellectual Property Office on Jan. 25, 2023, the disclosure of which is incorporated by reference herein in its entirety.

BACKGROUND

1. Field

The present disclosure relates to a storage device and an operating method thereof.

2. Description of Related Art

A storage device is a device that stores data under control of a host device such as a computer, a smart phone, and a smart pad. The storage device may include a magnetic disk such as a hard disk drive (HDD), or a semiconductor memory such as a solid state drive (SSD) and a memory card.

In the storage device, a memory controller checks an internal status such as a ready/busy status for each of a plurality of memory devices in order to control the plurality of memory devices in the storage device. Particularly, when one storage device includes a plurality of memory devices, the number of pads corresponding to ready/busy pins of the memory controller increases in order for the memory controller to check the internal status of each of the plurality of memory devices. There is a need for an internal status check processing technology for the plurality of memory devices that may improve an I/O processing speed while reducing the number of the pads of the memory controller.

The memory controller may check a status of each of the plurality of memory devices through a command for checking an internal status. However, the memory controller may check the internal status of the memory device only through a command including a die selection signal for indicating a memory device whose internal status is to be checked among the plurality of memory devices. As the number of memory devices connected to one memory controller increases, overhead required to check internal statuses of a plurality of memory devices increases.

SUMMARY

One or more example embodiments check internal statuses of a plurality of memory devices even without a die selection signal.

One or more example embodiments check internal statuses of a plurality of memory devices even without a separate pin.

One or more example embodiments check internal statuses of a plurality of memory devices connected to a memory controller.

According to an aspect of an example embodiment, a storage device includes: a plurality of memory devices configured to output status data indicating a busy state indicating an internal operation is being performed or a ready state; and an interface circuit configured to receive a command for reading the status data of the plurality of memory devices, receive the status data of each of the plurality of memory devices from the plurality of memory devices, and output entire status data indicating statuses of the plurality of memory devices based on the status data of each of the plurality of memory devices.

According to an aspect of an example embodiment, a storage device includes: a memory controller configured to transmit a first command; and a memory package including: a plurality of memory devices configured to output status data in response to the first command; an interface circuit connected between the plurality of memory devices and the memory controller, and configured to receive the status data from the plurality of memory devices and output a plurality of status data to the memory controller; and a package controller configured to generate a selection signal to control the interface circuit. The status data indicates whether a corresponding memory device is in a ready state or a busy state in which an internal operation is being performed.

According to an aspect of an example embodiment, an operating method of a storage device includes: receiving, by each of a plurality of memory devices, a first command, from a memory controller; outputting, by each of the plurality of memory devices, status data indicating whether a corresponding memory device is in a ready state or a busy state in which an internal operation is being performed, through a status output pin in response to receiving the first command; and generating a selection signal to control a plurality of selectors in an interface circuit to output the status data from each of the plurality of memory devices to the memory controller based on the first command.

BRIEF DESCRIPTION OF DRAWINGS

The above and other aspects and features will be more apparent from the following description of example embodiments with reference to the attached drawings, in which.

DETAILED DESCRIPTION

Figure 1:
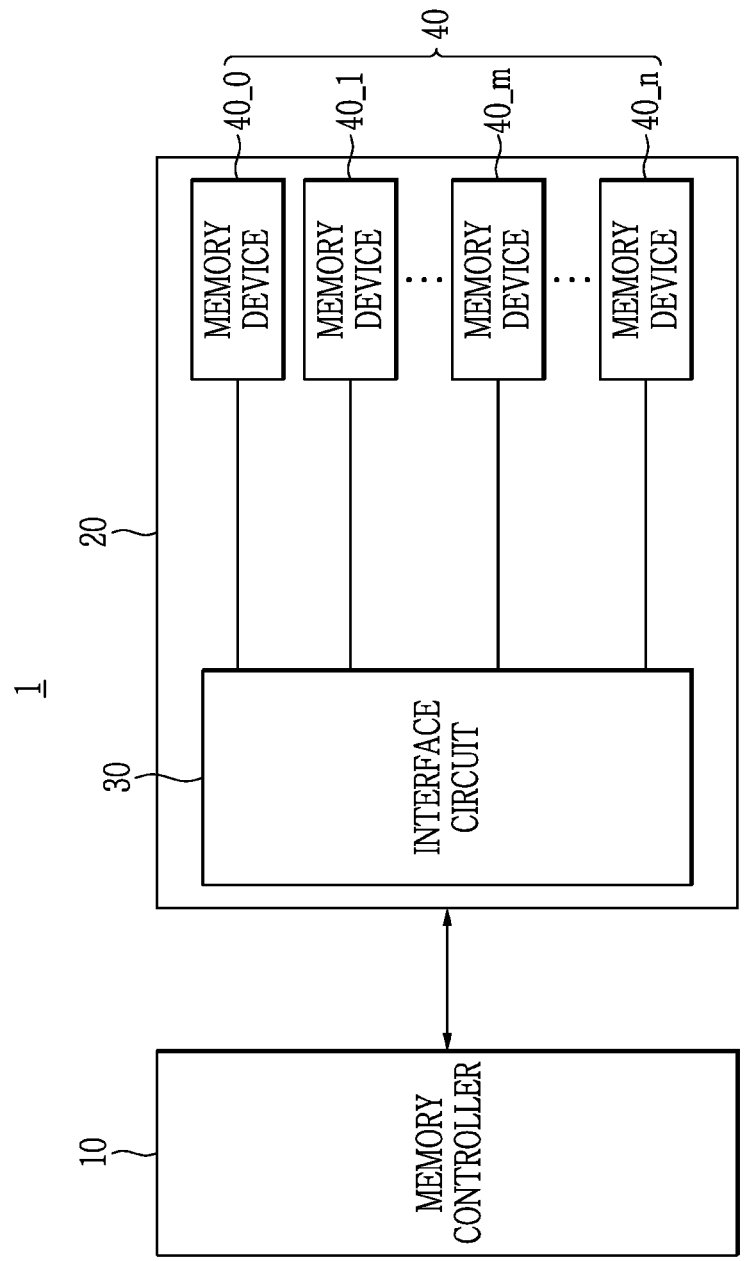
FIG. 1 illustrates a storage device according to an example embodiment.

Example embodiments will now be described with reference to the accompanying drawings. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure.

Accordingly, the drawings and description are to be regarded as illustrative in nature and not restrictive. Like reference numerals indicate like elements throughout the specification. The term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

FIG. 1 illustrates a storage device according to an example embodiment. Referring to FIG. 1, a storage device 1 may store data or process data in response to a command from a host. For example, the storage device 1 may be a solid state drive (SSD), a smart SSD, an embedded multimedia card (eMMC), an embedded universal flash storage (UFS) memory device, a UFS memory card, a compact flash (CF), a secure digital (SD), a micro secure digital (Micro-SD), a mini secure digital (Mini-SD), an extreme Digital (xD), or a memory stick.

The storage device 1 may include a memory controller 10 and a memory package 20. The memory controller 10 may control an operation of the storage device 1. For example, the memory controller 10 may control operations of a plurality of memory devices 40 based on a command, address, and data received from a host device. Specifically, when a command is received from the host device, the memory controller 10 may control each of the plurality of memory devices 40 according to the received command.

The memory controller 10 may perform a status read operation to determine a status of at least one of the plurality of memory devices 40 before or during controlling a specific operation of the plurality of memory devices 40. For example, the memory controller 10 may transmit a status read command to the plurality of memory devices 40. In response to the status read command, at least one of the plurality of memory devices 40 may output data indicating a status of the corresponding memory device to the memory controller 10. In addition, the memory controller 10 may transmit the status read command to the plurality of memory devices 40 to monitor whether an operation is completed.

The memory package 20 may include an interface circuit 30 and a plurality of memory devices (40_0, 40_1, ..., 40_m, ..., 40_n). For example, one memory package of 20 may include eight memory devices.

The interface circuit 30 may be connected between the plurality of memory devices 40 and the memory controller 10. The memory controller 10 may be connected to some or all of the plurality of memory devices 40 through the interface circuit 30.

Each of the plurality of memory devices 40 may store data. In some example embodiments, each of the plurality of memory devices 40 may be a non-volatile memory. In some example embodiments, the non-volatile memory may include a NAND flash memory. In another example embodiment, the non-volatile memory may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), or a similar memory.

Each of the plurality of memory devices 40 may perform a write operation, a read operation, or an erase operation under the control of the memory controller 10. For example, during a write operation, the memory device 40_m may receive a command, an address, and data from the memory controller 10 and perform the write operation. During a read operation, the memory device 40_m may receive a command and an address from the memory controller 10, and may output read data to the memory controller 10. The memory device 40_m may be referred to as a chip or die as an individual integrated chip (IC) that has undergone device processing.

In some example embodiments, the memory controller 10 may be disposed in the memory package 20. In FIG. 1, it is shown that one memory package 20 is connected to one memory controller 10, but the present disclosure is not limited thereto, and a plurality of memory packages 20 may be connected to one memory controller 10.

Figure 2:
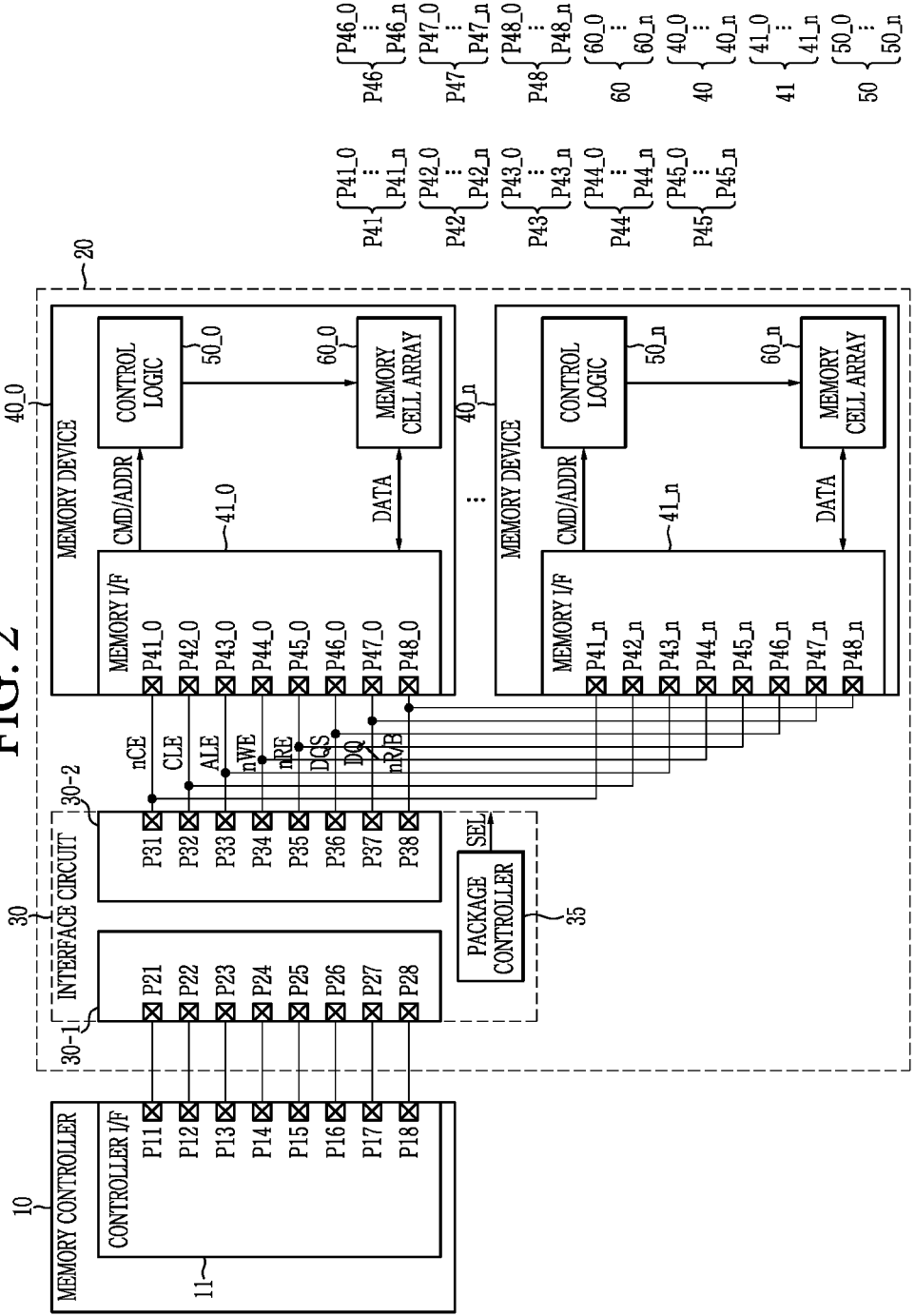
FIG. 2 specifically illustrates the storage device illustrated in FIG. 1 according to an example embodiment.

FIG. 2 illustrates the storage device illustrated in FIG. 1 according to an example embodiment.

Referring to FIG. 2, the storage device 1 may include the memory controller 10 and the memory package 20. The memory package 20 may include the interface circuit 30 and the plurality of memory devices 40. Hereinafter, the memory device 40_0 of the plurality of memory devices 40 will be described as an example. Hereinafter, descriptions of the memory device 400 may be equally applied to each of the plurality of memory devices 40.

The memory controller 10 may be connected to the interface circuit 30. The interface circuit 30 may be connected to the plurality of memory devices 40. The interface circuit 30 may connect a selected one of the plurality of memory devices 40 and the memory controller 10.

The memory device 40_0 may include a memory interface 41_0, a control logic 50_0, and a memory cell array 60_0.

The memory controller 10 and the memory device 40_0 may transmit and receive commands CMD, addresses ADDR, and data DATA through a controller interface 11, the interface circuit 30, and the memory interface 41_0.

The memory interface 41_0 may receive a chip enable signal nCE through a first pin P41_0. The chip enable signal nCE may be a signal for the memory controller 10 to indicate a specific memory package 20 among a plurality of memory packages connected to the memory controller 10. Specifically, the chip enable signal nCE may be a signal with which the memory controller 10 instructs the plurality of memory devices 40 in the memory package 20 in order to enable or disable the plurality of memory devices 40 in the specific memory package 20.

In some example embodiments, the memory interface 41_0 in the memory package 20 selected according to the chip enable signal nCE may transmit and receive signals to and from the memory controller 10 through a second pin P42_0, a third pin P43_0, a fourth pin P44_0, a fifth pin P45_0, a sixth pin P46_0, a seventh pin P47_0, and an eighth pin P48_0. For example, the memory interface 41 in the memory package 20 receiving the chip enable signal nCE that is in an enable state (for example, a low level) may transmit/receive signals to/from the memory controller 10 through the second to eighth pins P42 to P48.

The memory interface 41_0 may receive a command latch enable signal CLE through the second pin P42_0.

The command latch enable signal CLE may be a signal with which the memory controller 10 instructs the memory device 40_0 to load a command provided to the memory device 40_0 through the seventh pin P47_0 into a command register of the memory device 40_0. The command register may store a command received from the memory controller 10.

The memory interface 41_0 may receive an address latch enable signal ALE through the third pin P43_0.

The address latch enable signal ALE may be may be a signal with which the memory controller 10 instructs the memory device 40_0 to load an address provided to the memory device 40_0 through the seventh pin P47_0 into an address register. The address register may store a command received from the memory controller 10.

The memory interface 41_0 may receive a write enable signal nWE through the fourth pin P44_0.

The write enable signal nWE may be a signal with which the memory controller 10 instructs the memory device 40_0 so that the command CMD, the address ADDR, and the data DATA are transmitted from the memory controller 10 to the memory device 40_0.

In some example embodiments, the memory interface 41_0 may obtain the command CMD from a data signal DQ received through the seventh pin P47_0 in an enable period (for example, a high level state) of the command latch enable signal CLE based on toggle timings of the write enable signal nWE. In addition, the memory interface 41_0 may obtain the address ADDR from a data signal DQ received through the seventh pin P47_0 in an enable period (for example, a high level state) of the address latch enable signal ALE based on toggle timings of the write enable signal nWE.

The write enable signal nWE may toggle between a high level and a low level, or maintain a static state (for example, a high level or a low level). For example, the write enable signal nWE may toggle during a period in which the command CMD or the address ADDR is transmitted. Accordingly, the memory interface 41_0 may obtain the command CMD or the address ADDR based on the toggle timings of the write enable signal nWE.

The memory interface 41_0 may receive a read enable signal nRE through the fifth pin P45_0.

The read enable signal nRE may be a signal with which the memory controller 10 instructs the memory device 40_0 so that data is transmitted from the memory device 40_0 to the memory controller 10.

The memory interface 41_0 may receive a data strobe signal nRE through the sixth pin P46_0.

The memory controller 10 or the memory device 40_0 may receive the data signal DQ or transmit the data signal DQ in synchronization with the data strobe signal DQs.

When the data signal DQ including the data DATA is received from the memory controller 10 in an input operation of the data DATA of the memory device 40_0, the memory interface 41_0 may receive the data strobe signal DQs that toggles together with the data DATA from the memory controller 10. The memory interface 410 may obtain the data DATA from the data signal DQ based on the toggle timing of the data strobe signal DQs. For example, the memory interface 41_0 may obtain the data DATA by sampling the data signal DQ DQs at rising and falling edges of the data strobe signal DQs.

In the operation of outputting the data DATA of the memory device 40_0, when the read enable signal nRE is received from the memory controller 10, the memory interface 41_0 may generate the data strobe signal DQs that toggles based on the toggle timing of the read enable signal nRE. For example, the memory interface 41_0 may generate the data strobe signal DQs that toggles after a delay of a predetermined period based on a toggling start time of the read enable signal nRE. The memory interface 41_0 may transmit the data signal DQ including the data DATA to the memory controller 10 based on the toggle timing of the data strobe signal DQs. That is, the data DATA may be transmitted to the memory controller 10 in alignment with the toggle timing of the data strobe signal DQs.

The memory interface 41_0 may receive the data signal nRE through the seventh pin P47_0.

As described above, the data signal DQ may include the command CMD, the address ADDR, and the data DATA. In some example embodiments, the data signal DQ may be transmitted through a plurality of data signal lines.

In FIG. 2, it is illustrated that the data signal DQ is transmitted and received through one seventh pin P47_0, but the present disclosure is not limited thereto, and the data signal DQ may be transmitted and received through a plurality of pins. Hereinafter, pins used to transmit and receive the data signal DQ are referred to as data pins. For example, the memory interface 41_0 may include eight data pins to transmit and receive 8-bit data, and each of a plurality of pins may transmit and receive 1-bit data.

The memory interface 41_0 may output a ready/busy signal nRNB through an eighth pin P48_0. The memory interface 41_0 may transmit status data of the memory device 40_0 to the memory controller 10 through the ready/busy output signal nRNB. In this case, the eighth pin P48_0 may be referred to as a status output pin of the memory device 40_0.

The ready/busy signal nRNB may be a signal indicating the status data of the memory device 40_0.

In some example embodiments, when the memory device 40_0 is in a busy state, the memory interface 41_0 may transmit the ready/busy output signal nRNB indicating the busy status to the memory controller 10. When internal operations of the memory device 40_0 are being performed, the memory device 40_0 may be in a busy state. For example, while the memory device 40_0 reads the data DATA from the memory cell array 60_0 in response to a read command, the memory interface 41_0 may transmit the ready/busy output signal nRNB indicating a busy state (for example, a low level) to the memory controller 10. For example, while the memory device 40_0 writes the data DATA to the memory cell array 60_0 in response to a write command, the memory interface 41_0 may transmit the ready/busy output signal nRNB indicating a busy state to the memory controller 10.

In another example embodiment, when the memory device 40_0 is in a ready state, the memory interface 41_0 may transmit the ready/busy output signal nRNB indicating a ready state to the memory controller 10. When internal operations of the memory device 40_0 are not performed or have been completed, the memory device 40_0 may be in a ready state. For example, when the memory device 40_0 reads the data DATA from the memory cell array 60_0 for a predetermined period in response to a read command and the memory interface 41_0 receives the read data DATA from the memory cell array 60_0, the memory interface 41_0 may transmit the ready/busy output signal nRNB indicating a ready state (for example, a high level) to the memory controller 10.

The control logic 50_0 may overall control various operations of the memory device 40_0. The control logic 50_0 may receive the command CMD and the address ADDR obtained from the memory interface 41_0. The control logic 50_0 may generate control signals for controlling other constituent elements inside the memory device 40_0 according to the received command CMD and address ADDR. For example, the control logic 50_0 may generate various control signals for writing the data DATA to each memory cell array 60_0 or reading the data DATA from each memory cell array 60_0.

In some example embodiments, the control logic 50_0 may receive the command CMD including a read status command from the memory controller 10. The control logic 50_0 may generate status data based on the internal status of the memory device 40_0. The status data may indicate whether the memory device 40_0 is in a busy state in which internal operations are performed or whether the memory device 40_0 is in a ready state in which internal operations are not performed or have been completed.

The memory cell array 60_0 may store the data DATA obtained from the memory interface 41_0 under the control of the control logic 50_0. Each of the memory cell arrays 60_0 may output the stored data DATA to the memory interface 41_0 under the control of the control logic 50_0.

The memory cell array 60_0 may include a plurality of memory cells. For example, the plurality of memory cells may be flash memory cells. However, the present disclosure is not limited thereto, and the memory cells include resistive random access memory (RRAM) cells, ferroelectric random access memory (FRAM) cells, phase change random access memory (PRAM) cells, thyristor random access memory (TRAM) cells, or magnetic random access memory (MRAM) cells. Hereinafter, example embodiments of the present disclosure will be described focusing on an example embodiment in which the memory cells are NAND flash memory cells.

As shown in FIG. 2, channels connected to each of a plurality of first pins P41 to a plurality of eighth pins P48 form one channel, and the plurality of memory devices 40 may be connected to the memory controller 10 through the formed channel.

In some example embodiments, when the memory controller 10 transmits a command, data, and/or an address, each of the plurality of memory devices 40 connected to the corresponding channel may receive the command CMD, the data DATA, and/or the address ADDR. Each of the plurality of memory devices 40 may perform a corresponding operation based on the received command CMD and address ADDR.

The interface circuit 30 may transmit the command, address, and data received from the memory controller 10 to the plurality of memory devices 40 or a selected memory device among the plurality of memory devices 40, or may transmit the data received from the plurality of memory devices 40 or some memory devices among the plurality of memory devices 40 to the memory controller 10.

The interface circuit 30 may include a first internal circuit 30-1 to be connected to the memory controller 10, a second internal circuit 30-2 to be connected to the plurality of memory devices 40, and a package controller 35.

The first internal circuit 30-1 may include a first pin P21 to an eighth pin P28. The second internal circuit 30-2 may include a first pin P31 to an eighth pin P38.

The first pin P31 to the eighth pin P38 of the interface circuit 30 may correspond to the first pin P41 to the eighth pin P48 of the memory interface 41. The first pin P31 to the eighth pin P38 of the interface circuit 30 may be commonly connected to the first pin P41 to the eighth pin P48 of each of the plurality of memory devices 40. The first pin P21 to the eighth pin P28 of the interface circuit 30 may correspond to the first pin P31 to the eighth pin P38 of the interface circuit 30.

The package controller 35 is a component for controlling the interface circuit 30.

In some example embodiments, the package controller 35 may select one of the plurality of memory devices 40 connected to a corresponding channel through a die selection command. When the memory controller 10 transmits the die selection command to the memory package 20, the interface circuit 30 may generate a selection signal SEL for controlling the interface circuit 30 based on the die selection command. For example, the package controller 35 may control the first internal circuit 30-1 and the second internal circuit 30-2 so that the interface circuit 30 is connected to the memory controller 10 and the plurality of memory devices 40 or the memory controller 10 and some of the plurality of memory devices 40.

In some example embodiments, the package controller 35 may control the interface circuit 30 based on the command CMD. For example, when a command not including the die selection command is received from the memory controller 10, the package controller 35 may control the first internal circuit 30-1 and the second internal circuit 30-2 so that it is connected to the memory controller 10 and the plurality of memory devices 40 or the memory controller 10 and some of the plurality of memory devices 40 based on the command.

Then, when the memory controller 10 transmits a command, data, and/or an address, a selected memory device among the plurality of memory devices 40 connected to the corresponding channel may receive the command CMD, the data DATA, and/or the address ADDR.

In FIG. 2, the interface circuit 30 is illustrated as being disposed in the memory package 20, but the present disclosure is not limited thereto, and the interface circuit 30 may be configured as a separate chip disposed outside the memory package 20.

As shown in FIG. 2, the memory controller 10 may include the controller interface 11.

The controller interface 11 may include a first pin P11 to an eighth pin P18. The first pin P11 to the eighth pin P18 of the memory controller 10 may correspond to the first pin P21 to the eighth pin P28 of the interface circuit 30. Accordingly, the first pin P11 to the eighth pin P18 of the memory controller 10 may correspond to the first pin P41 to the eighth pin P48 of the plurality of memory devices 40.

The controller interface 11 may transmit the chip enable signal nCE to the plurality of memory devices 40 through the first pin P11. The controller interface 11 may transmit and receive signals through the second pin P12 to the eighth pin P18 of the plurality of memory devices 40 in the memory package 20 selected through the chip enable signal nCE.

The controller interface 11 may respectively transmit the command latch enable signal CLE, the address latch enable signal ALE, and the write enable signal nWE to the plurality of memory devices 40 through the second pin P12, the third pin P13, and the fourth pin P14.

The controller interface 11 may transmit the data signal DQ to the plurality of memory devices 40 or receive the data signal DQ from the plurality of memory devices 40 through the seventh pin P17.

The controller interface 11 may transmit the data signal DQ including the command CMD or the address ADDR to the plurality of memory devices 40 together with the write enable signal nWE that toggles. The controller interface 11 may transmit the data signal DQ including the command CMD to the plurality of memory devices 40 as the command latch enable signal CLE having an enabled status is transmitted, and may transmit the data signal DQ including the address ADDR to the plurality of memory devices 40 as the address latch enable signal ALE having an enabled status is transmitted.

The controller interface 11 may transmit the read enable signal nRE to the plurality of memory devices 40 through the fifth pin P15.

The controller interface 11 may receive the data strobe signal DQs from an arbitrary memory device through the sixth pin P16, or may transmit the data strobe signal DQs to one of the plurality of memory devices 40 or the plurality of memory devices.

In the operation of outputting the data DATA of the memory device 40_0, the controller interface 11 may generate a toggling read enable signal nRE, and transmit the read enable signal nRE to the memory device 40_0. For example, the controller interface 11 may generate the read enable signal nRE that is changed from a fixed state (for example, a high level or low level) to a toggle state before the data DATA is outputted. Accordingly, the data strobe signal DQs that toggles based on the read enable signal nRE may be generated in the memory device 40_0. The controller interface 11 may receive the data signal DQ including the data DATA together with the data strobe signal DQs that toggles from each of the plurality of memory devices 40. The controller interface 11 may obtain the data DATA from the data signal DQ based on the toggle timing of the data strobe signal DQs.

In the operation of inputting the data DATA of the memory device 40_0, the controller interface 11 may generate a toggling data strobe signal DQs. For example, the controller interface 11 may generate the data strobe signal DQs that is changed from a fixed state (for example, a high level or low level) to a toggle state before the data DATA is transmitted. The controller interface 11 may transmit the data signal DQ including the data DATA to the memory device 40_m based on the toggle timing of the data strobe signal DQs.

The controller interface 11 may receive the ready/busy output signal nRNB from the plurality of memory devices 40 through the eighth pin P18. The controller interface 11 may detect status data of each of the plurality of memory devices 40 based on the ready/busy output signal nRNB.

In some example embodiments, the controller interface 11 may receive status data of each of the plurality of memory devices 40 from each of the plurality of memory devices 40 through the seventh pin P17.

Figure 3:
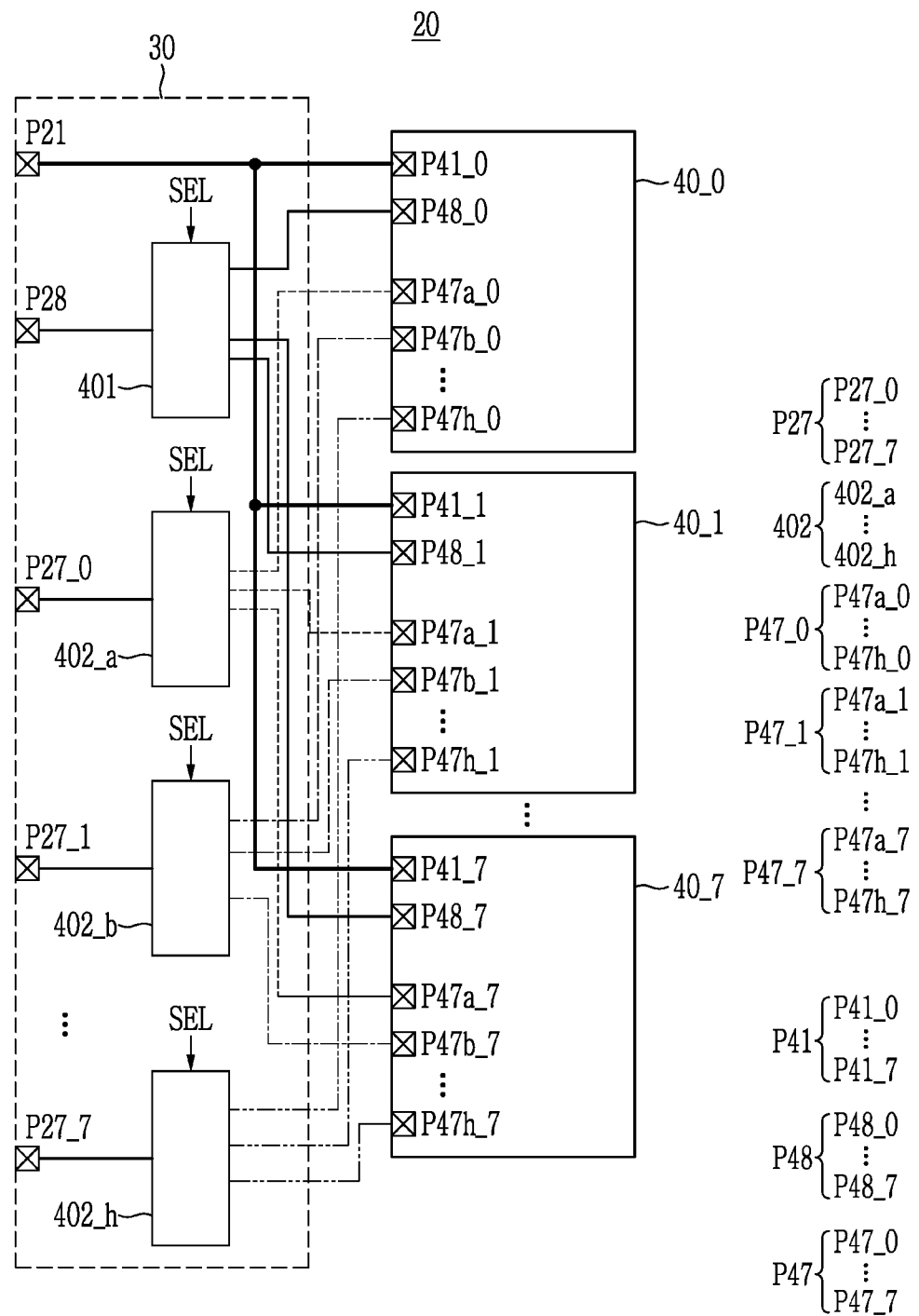
FIG. 3 illustrates a memory package according to an example embodiment.

FIG. 3 illustrates a memory package according to an example embodiment.

FIG. 3 illustrates a connection relationship between the interface circuit 30 and the plurality of memory devices 40 in the memory package 20.

In FIG. 3, it is assumed that one memory package 20 includes eight memory devices (40_0, 40_1, ..., 40_7). The present disclosure is not limited thereto, and one memory package 20 may include any number of memory devices.

Each of the plurality of memory devices 40 may include first pins (P41_0, P41_1, ..., P41_n), a plurality of data pins (P47_0, P47_1, ..., P47_n), and eighth pins (P48_0, P48_1, ..., P48_n). FIG. 3 illustrates that one memory device, for example, the memory device 40_0 includes eight data pins (P47a_0, P47b_0, ..., P47h_0), but the present disclosure is not limited thereto, and each of the plurality of memory devices 40 may include an arbitrary number of data pins.

Hereinafter, in each of the plurality of memory devices 40, the first data pin is referred to as a first data pin, the second data pin is referred to as a second data pin, the third data pin is referred to as a third data pin, ..., and the eighth data pin is referred to as an eighth data pin. For example, the first data pin may include a seventh pin P47a_0 of the memory device 40_0, a seventh pin P47a_1 of the memory device 40_1, ..., and a seventh pin P47a_n of the memory device 40_7. Similarly, the second data pin may include a seventh pin P47b_0 of the memory device 400, a seventh pin P47b_1 of the memory device 40_1, ..., and a seventh pin P47b_n of the memory device 40_7.

As shown in FIG. 3, the interface circuit 30 may include a first selector 401 and a plurality of second selectors (402_a, 402_b, ..., 402_h).

As described above, the interface circuit 30 may receive a chip enable signal CE from the memory controller 10 through the first pin P21. The first pin P21 may be connected to the plurality of first pins P41.

The interface circuit 30 may receive the data signal DQ from the memory controller 10 through a plurality of seventh pins P27. Alternatively, the interface circuit 30 may output the data DATA from each of the plurality of memory devices 40 through the plurality of seventh pins P27.

The plurality of memory devices 40 may receive the chip enable signal CE and a plurality of data signals DQ from the interface circuit 30. The plurality of memory devices 40 may derive the command CMD and/or the address ADDR based on the received data signal DQ.

The interface circuit 30 may output a ready/busy signal received from the plurality of memory devices 40 through the eighth pin P28.

In some example embodiments, the package controller 35 may receive the command CMD including a die selection command.

For example, the memory controller 10 may transmit a status read command CMD including the die selection command indicating one of the plurality of memory devices 40 to the memory package 20. The package controller 35 may generate the selection signal SEL that controls the interface circuit 30 so that a signal outputted from the memory device selected in response to the die selection command is outputted to the eighth pin P28. For example, the package controller 35 may generate the selection signal SEL for controlling the first selector 401.

The first selector 401 may be connected to eighth pins (P48_0, P48_1, . . . , P48_n; P48) of each of the plurality of memory devices 40. The first selector 401 may select one of the outputs received from the plurality of eighth pins P48 based on the selection signal SEL of the package controller 35, and may output the selected signal to the eighth pin P28. In some example embodiments, the first selector 401 may be configured as a multiplexer.

As another example, the memory controller 10 may transmit a read command CMD including the die selection command indicating one of the plurality of memory devices 40 to the plurality of memory devices 40. The package controller 35 may generate the selection signal SEL that controls the interface circuit 30 so that a signal outputted from the memory device selected in response to the die selection command is outputted to the seventh pin P27. For example, the package controller 35 may generate the selection signal SEL for controlling the second selector 402.

The plurality of second selectors 402 may be connected to data pins of each of the plurality of memory devices 40. In some example embodiments, data pins (for example, the first data pin, the second data pin, . . . , the eighth data pin, and the like) disposed at the same position in the plurality of memory devices 40 may be connected to each of the plurality of second selectors 402. In addition, the plurality of second selectors 402 may be connected to each of a plurality of seventh pins (P27_0, P27_1, . . . , P27_7) of the interface circuit 30. In some example embodiments, each of the plurality of second selectors 402 may be configured as a multiplexer.

For example, the second selector 402_a may be connected to the first data pin of each of the plurality of memory devices 40. The second selector 402_a may select one of the outputs received from the plurality of first data pins based on the selection signal SEL of the package controller 35, and may output the selected signal to the seventh pin P27_0.

As another example, the second selector 402_b may be connected to the second data pin of each of the plurality of memory devices 40. The second selector 402_b may select one of the outputs received from the plurality of second data pins based on the selection signal SEL of the package controller 35, and may output the selected signal to the seventh pin P27_1.

Similarly, the eighth selector 402_h may be connected to the eighth data pins. The eighth selector 402_h may select one of the outputs received from the plurality of eighth data pins based on the selection signal SEL of the package controller 35, and may output the selected signal to the seventh pin P27_7.

In some example embodiments, each of the plurality of second selectors 402 may output the data signal DQ received through the plurality of seventh pins P27 based on the selection signal SEL of the package controller 35 to the data pin P47 of the selected memory device.

Figure 4:
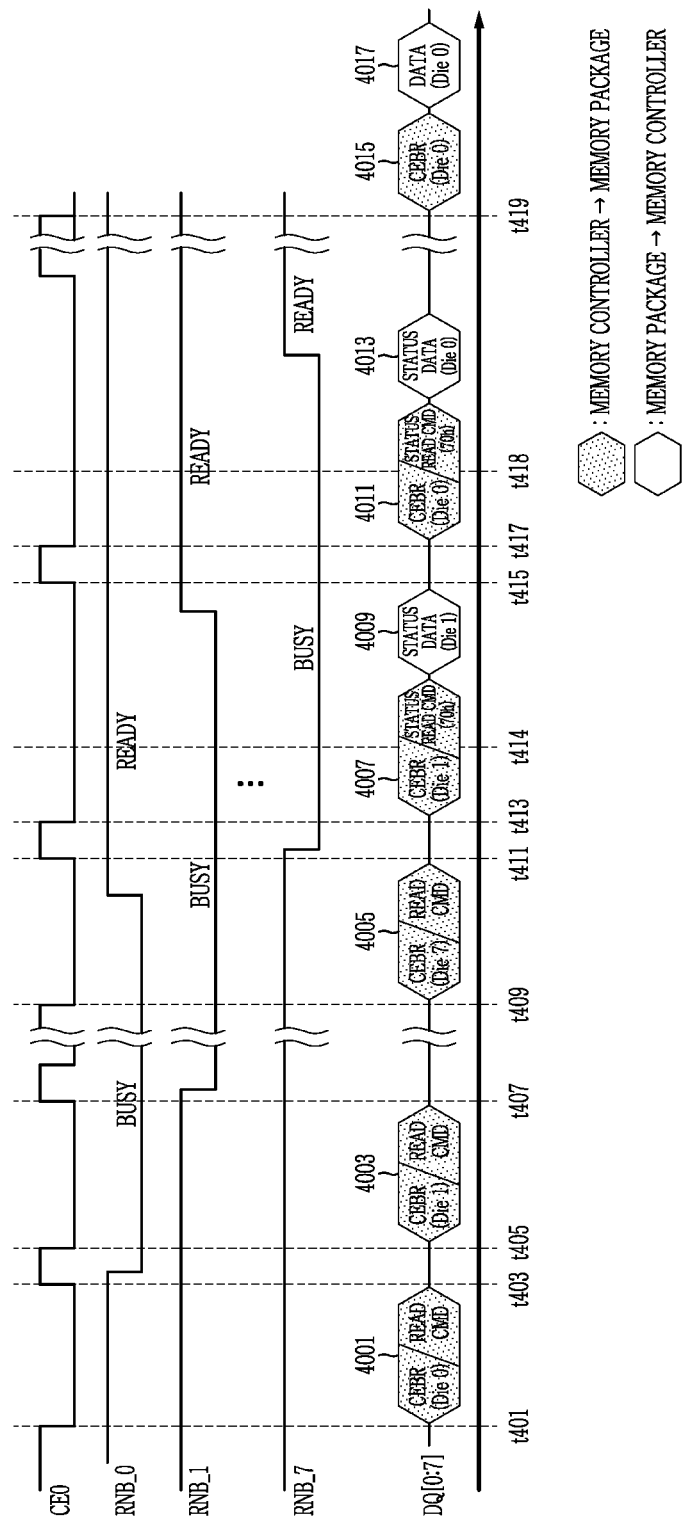
FIG. 4 illustrates a timing diagram of a chip enable signal, a ready/busy signal of a memory device, and a data signal according to an example embodiment FIG. 3.

FIG. 4 illustrates a timing diagram of the chip enable signal, the ready/busy signal of the memory device, and the data signal according to FIG. 3.

Specifically, FIG. 4 illustrates a chip enable signal CEO, a data signal DQ transmitted to the interface circuit 30 in the memory package 20 selected by the chip enable signal CEO, and ready/busy signals (RNB_0, RNB_1, . . . , RNB_7) outputted from each of the plurality of memory devices 40 in the selected memory package 20. Hereinafter, descriptions of the memory device 40_0 may be equally applied to each of the memory devices 40.

The ready/busy signal RNB_0 may indicate the status of the memory device 40_0. That is, the ready/busy signal RNB_0 may be a signal outputted from the eighth pin P48_0 of the memory device 40_0. When the ready/busy signal RNB_0 is at a low level, the memory device 400 may indicate a busy state, and when the ready/busy signal RNB_0 is at a high level, the memory device 40_0 may indicate a ready state.

In addition, the memory controller (10 in FIG. 1) may transmit a read command together with the read enable signal (nRE in FIG. 2), and in response to this, the memory interface 41_0 of the memory device 40_0 may transmit the data DATA to the memory controller 10 by aligning with the toggle timing of the data strobe signal DQs based on the read enable signal nRE.

First, at t401, the chip enable signal CEO transitions to an enable level (for example, a low level). The memory controller 10 may select the memory package 20 through the chip enable signal CEO.

While the chip enable signal CEO maintains a low level, the memory controller 10 may transmit the command CMD through the plurality of data signals DQ. The memory controller 10 may transmit a first command 4001 to the memory package 20 through the data signal DQ. In this case, the memory package 20 may be a memory package selected by the chip enable signal CEO. The first command 4001 may include a die selection signal and a read command for selecting die 0. The package controller 35 may generate the selection signal SEL for controlling the first selector 401 and the plurality of second selectors 402 so that the memory controller 10 and the memory device 40_0 are connected based on the die selection signal. The selection signal SEL may be a signal for connecting the plurality of second selectors 402 to the seventh pin P47_0 of the memory device 40_0.

Thereafter, in response to receiving the read command within the first command 4001, the memory device 40_0 may perform an internal operation for preparing data corresponding to the received first command 4001. That is, the memory device 40_0 may be in a busy state. Accordingly, the ready/busy signal RNB_0 indicating the status of the memory device 40_0 may transition to a low level indicating the busy state after a predetermined period after receiving the first command 4001.

At t403, the chip enable signal CEO may transition from a low level to a high level.

At t405, the chip enable signal CEO may transition from a high level to a low level. While the chip enable signal CEO is maintained at the low level, the memory controller 10 may transmit a second command 4003 to the memory package 20 through the data signal DQ. The second command 4003 may include a die selection signal CEBR and a read command for selecting die 1. The package controller 35 may generate the selection signal SEL for connecting the memory controller 10 and the memory device 40_1 in response to the die selection signal. The selection signal SEL may be a signal for connecting the plurality of second selectors 402 to the seventh pin P47_1 of the memory device 40_1.

Thereafter, in response to receiving the read command of the second command 4003, the memory device 40_1 may perform an internal operation for preparing data corresponding to the received second command 4003. Accordingly, the ready/busy signal RNB_1 indicating the status of the memory device 40_1 may transition to a low level after a predetermined period after receiving the second command 4003.

At t407, the chip enable signal CEO may transition from a low level to a high level.

At t409, the chip enable signal CEO may transition from a high level to a low level. While the chip enable signal CEO is maintained at the low level, the memory controller 10 may transmit a third command 4005 to the memory package 20 through the data signal DQ. The third command 4005 may include a die selection signal CEBR and a read command for selecting die 7. The package controller 35 may generate the selection signal SEL for connecting the memory controller 10 and the memory device 40_7 based on the die selection signal. The selection signal SEL may be a signal for connecting the plurality of second selectors 402 to the seventh pin P47_7 of the memory device 40_7.

In response to receiving the read command of the third command 4005, the memory device 40_7 may perform an internal operation for preparing data corresponding to the received third command 4005. Accordingly, the ready/busy signal RNB_7 indicating the status of the memory device 407 may transition to a low level after a predetermined period after receiving the third command 4005.

At t411, the chip enable signal CEO may transition from a low level to a high level.

At t413, the chip enable signal CEO may transition from a high level to a low level. While the chip enable signal CEO is maintained at the low level, the memory controller 10 may transmit a fourth command 4007 to the memory package 20 through the data signal DQ. The fourth command 4007 may include a die selection signal CEBR and a status read command 70h for selecting die 1. The package controller 35 may generate the selection signal SEL for connecting the memory controller 10 and the memory device 40_1 based on the die selection signal. The selection signal SEL may be a signal for connecting the first selector 401 to the eighth pin P48_1 of the memory device 40_1. In some example embodiments, the memory device 40_1 may output status data 4009 indicating the status of the memory device 40_1 at a time point of receiving the status read command 70h or at any time point (for example, t414) while receiving the status read command 70h. The status data 4009 may indicate a busy state, which is the status of the memory device 40_1 at t414.

At t415, the chip enable signal CEO may transition from a low level to a high level.

At t417, the chip enable signal CEO may transition from a high level to a low level. While the chip enable signal CEO is maintained at the low level, the memory controller 10 may transmit a fifth command 4011 to the memory package 20 through the data signal DQ. The fifth command 4011 may include a die selection signal CEBR and a status read command 70h for selecting die 0. The package controller 35 may generate the selection signal SEL for connecting the memory controller 10 and the memory device 40_0 based on the die selection signal. The selection signal SEL may be a signal for connecting the first selector 401 to the eighth pin P48_0 of the memory device 40_0. In some example embodiments, the memory device 400 may output status data 4013 indicating the status of the memory device 40_0 at any time point (for example, t418) while receiving the status read command 70h. The status data 4013 may indicate a ready state, which is the status of the memory device 40_0 at t418.

Then, at t419, the chip enable signal CEO may transition from a high level to a low level. While the chip enable signal CEO is maintained at the low level, the memory controller 10 may transmit a sixth command 4015 to the memory package 20 through the data signal DQ. The sixth command 4015 may include a die selection signal CEBR for selecting die 0. In response to the sixth command 4015, the package controller 35 may generate the selection signal SEL for connecting the memory controller 10 and the memory device 40_0 based on the die selection signal. The selection signal SEL may be a signal for controlling the plurality of second selectors 402 so as to output the data outputted from the memory device 40_0 having performed the read operation in response to the sixth command 4015 as the data signal DQ through the plurality of seventh pins P27.

Figure 5:
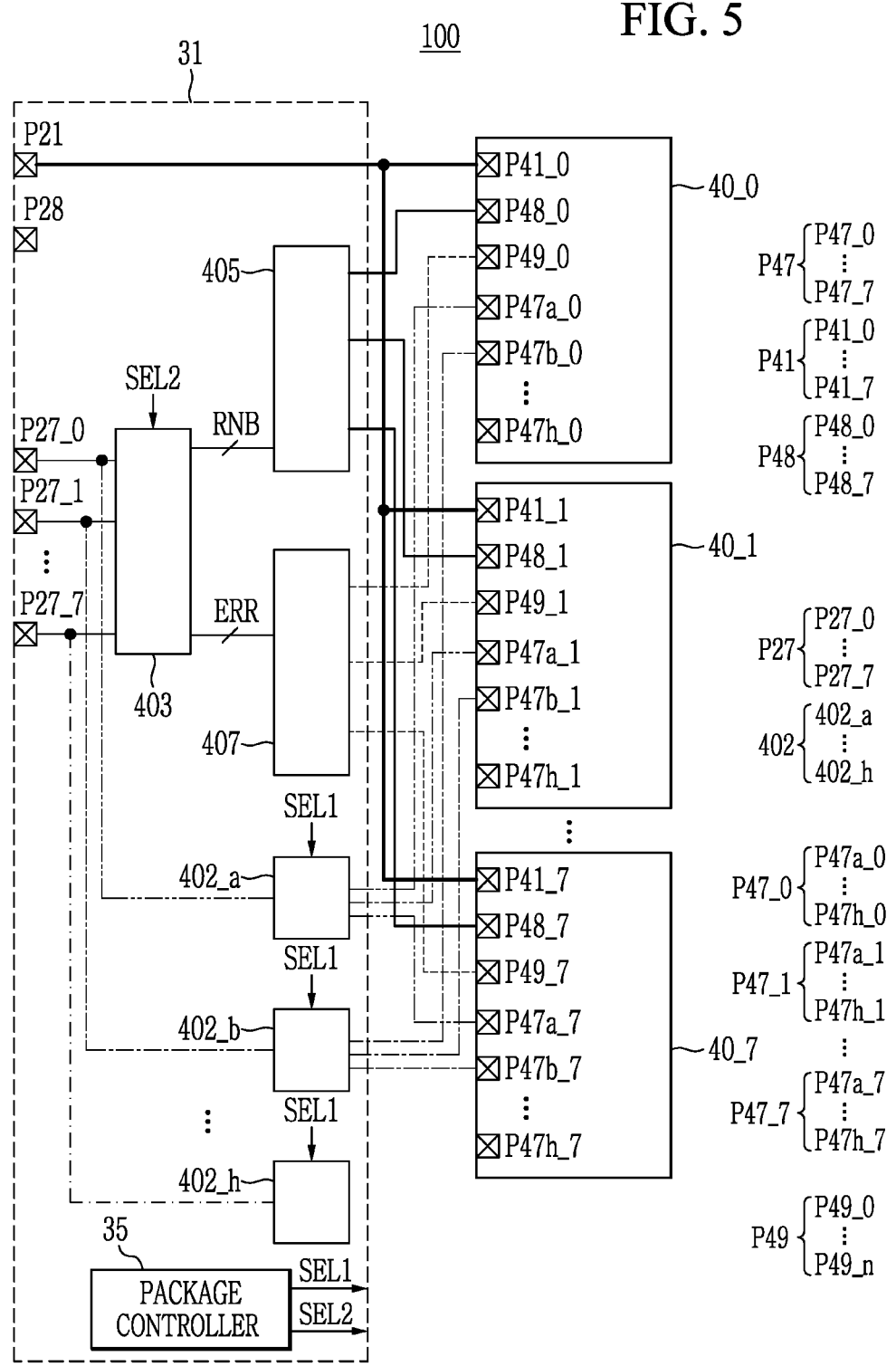
FIG. 5 illustrates a memory package according to an example embodiment.

FIG. 5 illustrates a memory package according to an example embodiment.

FIG. 5 illustrates a connection relationship between the interface circuit 31 and the plurality of memory devices 40 in the memory package 100.

In FIG. 5, it is assumed that one memory package 100 includes eight memory devices (40_0, 40_1, . . . , 40_7). The present disclosure is not limited thereto, and one memory package 100 may include any number of memory devices.

Each of the plurality of memory devices 40 may include first pins (P41_0, P41_1, . . . , P41_n), a plurality of data pins (P47_0, P47_1, . . . , P47_n), eighth pins (P48_0, P48_1, . . . , P48_n), and ninth pins (P49_0, P49_1, . . . , P49_n). FIG. 5 illustrates that one memory device, for example, the memory device 40_0 includes eight data pins (P47a_0, P47b_0, . . . , P47h_0), but the present disclosure is not limited thereto, and each of the plurality of memory devices 40 may include an arbitrary number of data pins.

Hereinafter, descriptions of the memory device 40_0 may be equally applied to each of the memory devices 40.

The memory device 40_0 may output an error signal nERR through the ninth pin P49_0. The memory device 40_0 may transmit error data of the memory device 40_0 to the memory controller 10 through the error signal nERR. The error data may include information about a component in which an error occurred among components in the memory device 40_0. The error may occur when an arbitrary sequence is broken while processing received data when the memory device 40_0 writes data to the memory cell array 60_0 in response to a write command.

Hereinafter, in each of the plurality of memory devices 40, the first data pin is referred to as a first data pin, the second data pin is referred to as a second data pin, the third data pin is referred to as a third data pin, . . . , and the eighth data pin is referred to as an eighth data pin. For example, the first data pin may include a seventh pin P47a_0 of the memory device 40_0, a seventh pin P47a_1 of the memory device 40_1, . . . , and a seventh pin P47a_n of the memory device 40_7. Similarly, the second data pin may include a seventh pin P47b_0 of the memory device 400, a seventh pin P47b_1 of the memory device 40_1, . . . , and a seventh pin P47b_n of the memory device 40_7.

As shown in FIG. 5, the interface circuit 31 may include a plurality of second selectors (402_a, 402_b, . . . , 402_h), a third selector 403, a fourth selector 405, and a fifth selector 407.

The interface circuit 31 may receive the chip enable signal CE from the memory controller 10 through the first pin P21. The first pin P21 may be connected to a plurality of first pins P41 of the plurality of memory devices 40.

The interface circuit 31 may receive the data signal DQ from the memory controller (10 in FIG. 3) through a plurality of seventh pins P27. Alternatively, the interface circuit 31 may output the data DATA from each of the plurality of memory devices 40 through the plurality of seventh pins P27.

The plurality of memory devices 40 may receive the chip enable signal CE and a plurality of data signals DQ from the interface circuit 31. The plurality of memory devices 40 may derive the command CMD and/or the address ADDR based on the received data signal DQ.

The interface circuit 31 may output a ready/busy signal RNB or an error signal ERR received from each of the plurality of memory devices 40 through the plurality of seventh pins P27.

In some example embodiments, the plurality of memory devices 40 may receive a command CMD that does not include a separate die selection command CEBR.

For example, the memory controller 10 may transmit an entire status read command CMD to each of the plurality of memory devices 40. The package controller 35 may generate a selection signal SEL2 that controls the third selector 403 so that signals outputted from the eighth pin P48 are outputted to the plurality of seventh pins P27. For example, the package controller 35 may generate the second selection signal SEL2 that controls the third selector 403 to be connected to the fourth selector 405.

In another example embodiment, the memory controller 10 may transmit an entire error read command CMD to each of the plurality of memory devices 40. The package controller 35 may generate a selection signal SEL2 that controls the third selector 403 so that signals outputted from the ninth pin P49 are outputted to the plurality of seventh pins P27. For example, the package controller 35 may generate a second selection signal SEL2 that controls the third selector 403 to be connected to the fifth selector 407.

The third selector 403 may be connected to the fourth selector 405 and the fifth selector 407. The third selector 403 may be connected to the plurality of seventh pins P27. The third selector 403 may connect the plurality of seventh pins P27 to an output terminal of the fourth selector 405 or an output terminal of the fifth selector 407 based on the second selection signal SEL2. In some example embodiments, the third selector 403, the fourth selector 405, and the fifth selector 407 may be configured as multiplexers.

In some example embodiments, the fourth selector 405 may be connected to the eighth pins (P48_0, P48_1, ..., P48_n) of each of the plurality of memory devices 40. For example, because memory package 100 includes eight memory devices (40_0, 40_1, ..., 40_7), the fourth selector 405 may be connected to eight eighth pins (P48_0, P48_1, ..., P48_7). Accordingly, status data of each of the eight memory devices (40_0, 40_1, ..., 40_7) may be input to the fourth selector 405.

In some example embodiments, the fifth selector 407 may be connected to the ninth pin P49 of each of the plurality of memory devices 40. For example, because the memory package 100 includes the eight memory devices (40_0, 40_1, ..., 40_7), the fifth selector 407 may be connected to the eight ninth pins (P49_0, P49_1, ..., P49_7). Accordingly, error data of each of the eight memory devices (40_0, 40_1, ..., 40_7) may be input to the fifth selector 407.

The plurality of second selectors 402 may be connected to data pins of each of the plurality of memory devices 40. In addition, the plurality of second selectors 402 may be connected to each of the plurality of seventh pins (P27_0, P27_1, ..., P27_7) of the interface circuit 30. The package controller 35 may generate a first selection signal SEL1 that controls the plurality of second selectors 402 so that a signal outputted from the memory device is selected and provided to the plurality of seventh pins P27.

Figure 6:
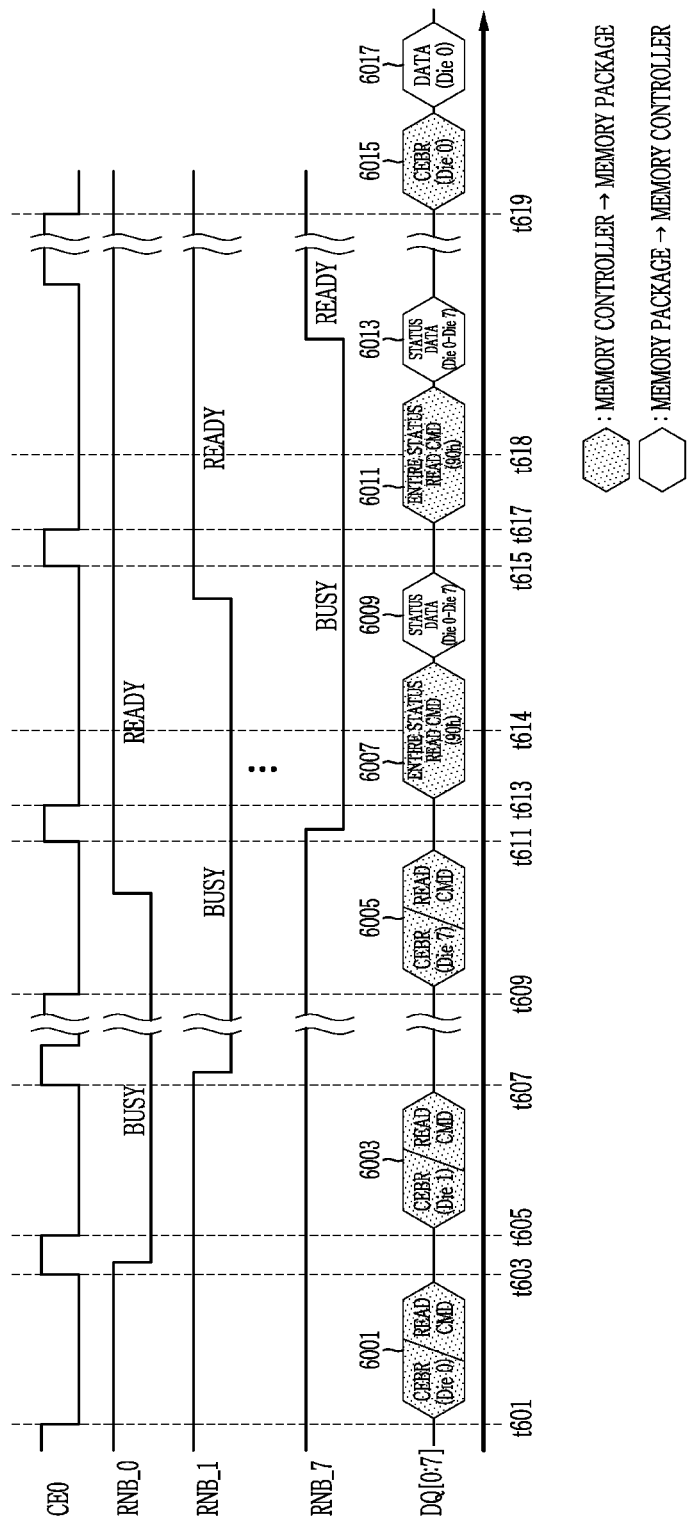
FIG. 6 illustrates a timing diagram of a chip enable signal of a memory package, a ready/busy signal of a memory package, and a data signal according to an example embodiment.

FIG. 6 illustrates a timing diagram of a chip enable signal of a memory package, a ready/busy signal of a memory package, and a data signal according to FIG. 5.

Specifically, FIG. 6 illustrates a chip enable signal CEO, a data signal DQ transmitted to the interface circuit 31 in the memory package 100 selected by the chip enable signal CEO, and ready/busy signals (RNB_0, RNB_1, ..., RNB_7) outputted from each of the plurality of memory devices 40 in the selected memory package 100. Hereinafter, descriptions of the memory device 40_0 may be equally applied to each of the memory devices 40.

In addition, the memory controller (10 in FIG. 1) may transmit a read command together with the read enable signal (nRE in FIG. 2), and in response to this, the memory interface 41_0 of the memory device 40_0 may transmit the data DATA to the memory controller 10 by aligning with the toggle timing of the data strobe signal DQs based on the read enable signal nRE.

First, at t601, the chip enable signal CEO transitions to an enable level (for example, a low level). The memory controller 10 may select the memory package 100 through the chip enable signal CEO.

While the chip enable signal CEO maintains a low level, the memory controller 10 may transmit the command CMD through the plurality of data signals DQ. The memory controller 10 may transmit a first command 6001 to the memory package 100 through the data signal DQ. In this case, the memory package 100 may be a memory package selected by the chip enable signal CEO. The first command 6001 may include a die selection signal CEBR and a read command for selecting die 0. The package controller 35 may generate a first selection signal SEL1 for connecting the memory controller 10 and the memory device 40_0 based on the die selection signal CEBR. The first selection signal SEL1 may be a signal for connecting the plurality of second selectors 402 to the seventh pin P47_0 of the memory device 40_0.

Thereafter, in response to receiving the read command within the first command 6001, the memory device 40_0 may perform an internal operation for preparing data corresponding to the received first command 6001. That is, the memory device 40_0 may be in a busy state. Accordingly, the ready/busy signal RNB_0 indicating the status of the memory device 40_0 may transition to a low level indicating the busy state after a predetermined period after receiving the first command 6001.

At t603, the chip enable signal CEO may transition from a low level to a high level.

At t605, the chip enable signal CEO may transition from a high level to a low level. While the chip enable signal CEO is maintained at the low level, the memory controller 10 may transmit a second command 6003 to the memory package 100 through the data signal DQ. The second command 6003 may include a die selection signal CEBR and read command for selecting die 1. The package controller 35 may generate a first selection signal SEL1 for connecting the memory controller 10 and the memory device 40_1 based on the die selection signal CEBR. The first selection signal SEL1 may be a signal for connecting the plurality of second selectors 402 to the seventh pin P47_1 of the memory device 40_1.

Thereafter, in response to receiving the read command within the second command 6003, the memory device 40_1 may perform an internal operation for preparing data corresponding to the received second command 6003. Accordingly, the ready/busy signal RNB_1 indicating the status of the memory device 40_1 may transition to a low level after a predetermined period after receiving the second command 6003.

At t607, the chip enable signal CEO may transition from a low level to a high level.

At t609, the chip enable signal CEO may transition from a high level to a low level. While the chip enable signal CEO is maintained at the low level, the memory controller 10 may transmit a third command 6005 to the memory package 100 through the data signal DQ. The third command 6005 may include a die selection signal CEBR and a read command for selecting die 7. The package controller 35 may generate a first selection signal SEL1 for connecting the memory controller 10 and the memory device 40_7 based on the die selection signal CEBR. The first selection signal SEL1 may be a signal for connecting the plurality of second selectors 402 to the seventh pin P47_7 of the memory device 40_7.

In response to receiving the read command of the third command 6005, the memory device 40_7 may perform an internal operation for preparing data corresponding to the received third command 6005. Accordingly, the ready/busy signal RNB_7 indicating the status of the memory device 407 may transition to a low level after a predetermined period after receiving the third command 6005.

At t611, the chip enable signal CEO may transition from a low level to a high level.

At t613, the chip enable signal CEO may transition from a high level to a low level. While the chip enable signal CEO is maintained at the low level, the memory controller 10 may transmit a fourth command 6007 to the memory package 100 through the data signal DQ. The fourth command 6007 may include an entire status read command 90h. The package controller 35 may generate a second selection signal SEL2 for connecting the memory controller 10 and the plurality of memory devices 40. For example, the second selection signal SEL2 may be a signal for connecting the third selector 403 to the fourth selector 405.

In some example embodiments, the memory device 400 may output status data indicating the status of the memory device 40_0 at a time point of receiving the entire status read command 90h or at any time point (for example, t614) while receiving the entire status read command 90h.

In some example embodiments, the plurality of memory devices 40 may output entire status data 6009 in response to receiving the fourth command 6007. The entire status data 6009 may indicate the status of each of the plurality of memory devices 40 at t614. Specifically, because the memory device 40_0 is in a ready state, the seventh pin P27_0 may output a bit (for example, 1) indicating the ready state. Because the memory devices (40_1, . . . , 40_7) at t614 are in a busy state, the seventh pin (P27_1, . . . , P27_7) may output a bit (for example, 0) indicating the busy state.

The memory controller 10 may detect status data of each of the memory devices 40 based on the entire status data 6009 outputted from the memory package 100 in response to the fourth command 6007. The memory controller 10 does not obtain status data indicating the status of one memory device 40_0, but may obtain entire status data indicating the status of each of the plurality of memory devices 40 through the entire status read command. For example, the memory controller 10 may detect the status data of the memory device 40_0 through data outputted through the seventh pin P27_0, may detect the status data of the memory device 40_1 through data outputted through the seventh pin P27_1, and may detect the status data of the memory device 40_2 through data outputted through the seventh pin P27_3.

Subsequently, at t615, the chip enable signal CEO may transition from a low level to a high level.

At t617, the chip enable signal CEO may transition from a high level to a low level. While the chip enable signal CEO is maintained at the low level, the memory controller 10 may transmit a fifth command 6011 to the memory package 100 through the data signal DQ. The fifth command 6011 may include an entire status read command 90h. The package controller 35 may generate a second selection signal SEL2 for connecting the memory controller 10 and the plurality of memory devices 40. For example, the second selection signal SEL2 may be a signal for connecting the third selector 403 to the fourth selector 405.

In some example embodiments, the plurality of memory devices 40 may output entire status data 6013 in response to receiving the fifth command 6011. The entire status data 6013 may indicate the status of each of the plurality of memory devices 40 at t618. Specifically, because the memory devices 40_0 and 40_1 are in a ready state, the seventh pins P27_0 and P27_1 may output a bit (for example, 1) indicating the ready state. Because the memory devices (40_2, . . . , 40_7) at t614 are in a busy state, the seventh pin (P27_2, . . . , P27_7) may output a bit (for example, 0) indicating the busy state.

Then, at t619, the chip enable signal CEO may transition from a high level to a low level. While the chip enable signal CEO is maintained at the low level, the memory controller 10 may transmit a sixth command 6015 to the memory package 100 through the data signal DQ. The sixth command 6015 may include a die selection signal CEBR for selecting die 0. In response to the sixth command 6015, the package controller 35 may generate a first selection signal SEL1 for connecting the memory controller 10 and the memory device 40_0. For example, the first selection signal SEL1 may be a signal for connecting the plurality of second selectors 402 to data pins of the memory device 40_0.

Then, the memory device 40_0 may output data 6017 corresponding to the first command 6001 through the seventh pin P47_0. The interface circuit 31 may output data outputted from the memory device 40_0 as the data 6017 through the plurality of second selectors 402 and the plurality of seventh pin P27.

Figure 7:
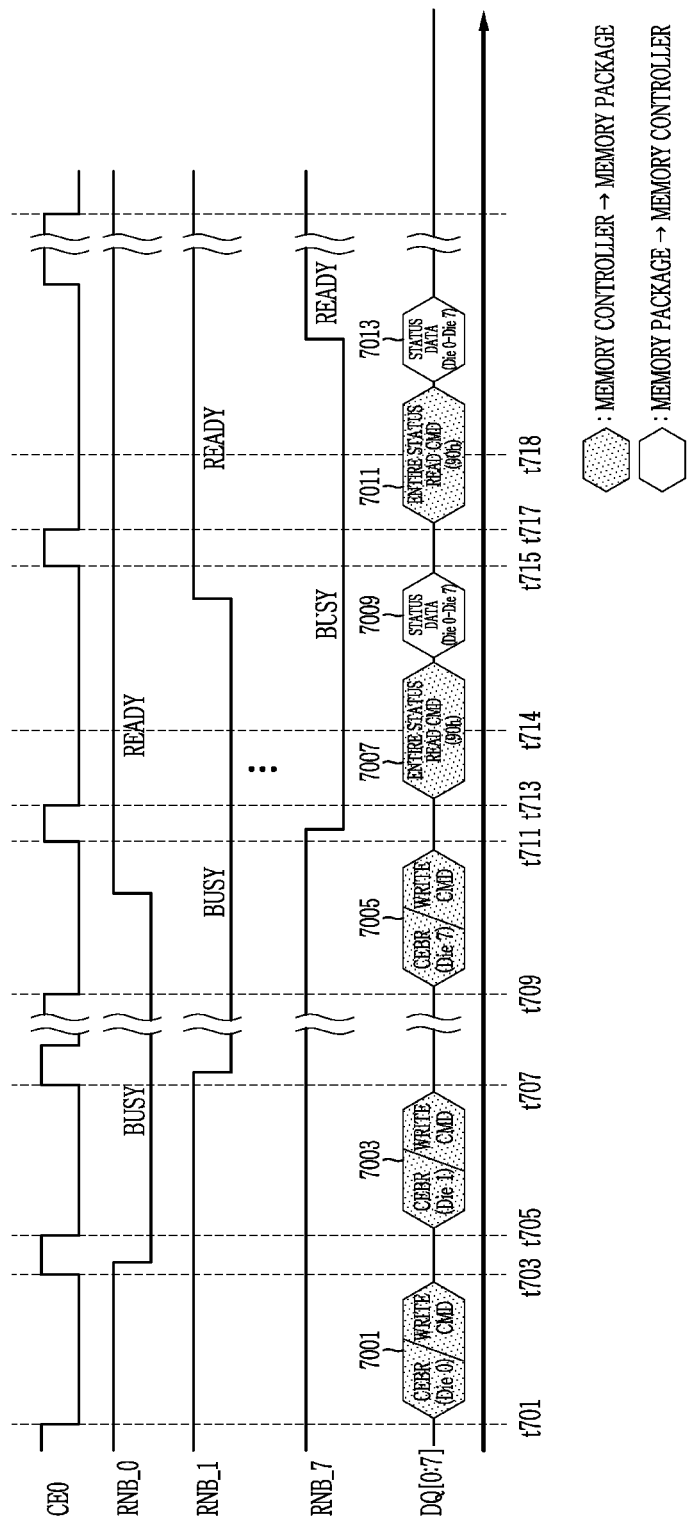
FIG. 7 illustrates a timing diagram of a chip enable signal of a memory package, a ready/busy signal of a memory package, and a data signal according to an example embodiment.

FIG. 7 illustrates a timing diagram of a chip enable signal of a memory package, a ready/busy signal of a memory package, and a data signal according to FIG. 5.

Specifically, FIG. 7 illustrates a chip enable signal CEO, a data signal DQ transmitted to the interface circuit 30 in the memory package 100 selected by the chip enable signal CEO, and ready/busy signals (RNB_0, RNB_1, . . . , RNB_7) outputted from each of the plurality of memory devices 40 in the selected memory package 100. Hereinafter, descriptions of the memory device 40_0 may be equally applied to each of the memory devices 40.

In addition, the memory controller 10 may transmit a write command together with the write enable signal (nWE of FIG. 2), and in response to this, the memory interface 41_0 of the memory device 40_0 may receive data DATA in alignment with the toggle timing of the write enable signal nRE. Then, each of the plurality of memory devices 40 may perform a write operation.

First, at t701, the chip enable signal CEO transitions to an enable level (for example, a low level). The memory controller 10 may select the memory package 100 through the chip enable signal CEO.

While the chip enable signal CEO is maintained at the low level, the memory controller 10 may transmit the command CMD through the plurality of data signals DQ. The memory controller 10 may transmit a first command 7001 to the memory package 100 through the data signal DQ. In this case, the memory package 100 may be a memory package selected by the chip enable signal CEO. The first command 7001 may include a die selection signal CEBR and a write command for selecting die 0. The package controller 35 may generate a first selection signal SEL1 for connecting the memory controller 10 and the memory device 40_0 based on the die selection signal CEBR. The first selection signal SEL1 may be a signal for connecting the plurality of second selectors 402 to the seventh pin P47_0 of the memory device 40_0.

In response to receiving the write command within the first command 7001, the memory device 40_0 may perform an internal operation for writing data corresponding to the received first command 7001. That is, the memory device 40_0 may be in a busy state. Accordingly, the ready/busy signal RNB_0 indicating the status of the memory device 40_0 may transition to a low level indicating the busy state after a predetermined period after receiving the first command 7001.

At t703, the chip enable signal CEO may transition from a low level to a high level.

At t705, the chip enable signal CEO may transition from a high level to a low level. While the chip enable signal CEO is maintained at the low level, the memory controller 10 may transmit a second command 7003 to the memory package 100 through the data signal DQ. The second command 7003 may include a die selection signal CEBR and a write command for selecting die 1. The package controller 35 may generate a first selection signal SEL1 for connecting the memory controller 10 and the memory device 40_1 based on the die selection signal CEBR. The first selection signal SEL1 may be a signal for connecting the plurality of second selectors 402 to the seventh pin P47_1 of the memory device 40_1.

Thereafter, in response to receiving the write command within the second command 7003, the memory device 40_1 may perform an internal operation for writing data corresponding to the received second command 7003. Accordingly, the ready/busy signal RNB_1 indicating the status of the memory device 40_1 may transition to a low level after a predetermined period after receiving the second command 7003.

At t707, the chip enable signal CEO may transition from a low level to a high level.

At t709, the chip enable signal CEO may transition from a high level to a low level. While the chip enable signal CEO is maintained at the low level, the memory controller 10 may transmit a third command 7005 to the memory package 100 through the data signal DQ. The third command 7005 may include a die selection signal CEBR and a write command for selecting die 7. The package controller 35 may generate a first selection signal SEL1 for connecting the memory controller 10 and the memory device 40_7 based on the die selection signal CEBR. The first selection signal SEL1 may be a signal for connecting the plurality of second selectors 402 to the seventh pin P47_7 of the memory device 40_7.

In response to receiving the write command within the third command 7005, the memory device 40_7 may perform an internal operation for writing data corresponding to the received third command 7005. Accordingly, the ready/busy signal RNB_7 indicating the status of the memory device 407 may transition to a low level after a predetermined period after receiving the third command 7005.

At t711, the chip enable signal CEO may transition from a low level to a high level.

At t713, the chip enable signal CEO may transition from a high level to a low level. While the chip enable signal CEO is maintained at the low level, the memory controller 10 may transmit a fourth command 7007 to the memory package 100 through the data signal DQ. The fourth command 7007 may include an entire error read command 98$h$. The package controller 35 may generate a second selection signal SEL2 for connecting the memory controller 10 and the plurality of memory devices 40. For example, the second selection signal SEL2 may be a signal for connecting the third selector 403 to the fifth selector 407.

In some example embodiments, the memory device 400 may output error data including error information of the memory device 40_0 at a time point of receiving the entire error read command 98$h$ or at any time point (for example, t714) while receiving the entire error read command 98$h$.

In some example embodiments, the plurality of memory devices 40 may output entire error data 7009 in response to receiving the fourth command 7007. The entire error data 7009 may indicate whether an error exists in each of the plurality of memory devices 40 at t714. Specifically, when an error exits in the memory device 40_0, the seventh pin P27_0 may output a bit (for example, 1) indicating that there is an error. When no error exists in the memory devices (40_1, . . . , 40_7), the seventh pin (P27_1, . . . , P27_7) may output a bit (for example, 0) indicating no error. The memory controller 10 does not obtain status data indicating the error of one memory device 400, but may obtain entire error data indicating the status of each of the plurality of memory devices 40 through the entire error read command. For example, the memory controller 10 may detect the error data of the memory device 40_0 through data outputted through the seventh pin P27_0, may detect the error data of the memory device 40_1 through data outputted through the seventh pin P27_1, and may detect the error data of the memory device 40_2 through data outputted through the seventh pin P27_2.

The memory controller 10 may detect error data of each of the memory devices 40 based on the entire error data 7009 outputted from the memory package 100 in response to the fourth command 7007.

Subsequently, at t715, the chip enable signal CEO may transition from a low level to a high level.

At t717, the chip enable signal CEO may transition from a high level to a low level. While the chip enable signal CEO is maintained at the low level, the memory controller 10 may transmit a fifth command 7011 to the memory package 100 through the data signal DQ. The fifth command 7011 may include an entire error read command 98$h$. The package controller 35 may generate a second selection signal SEL2 for connecting the memory controller 10 and the plurality of memory devices 40. For example, the second selection signal SEL2 may be a signal for connecting the third selector 403 to the fifth selector 407.

In some example embodiments, the plurality of memory devices 40 may output error data 7013 in response to receiving the fifth command 7011. The error data 7013 may indicate whether an error exists in each of the plurality of memory devices 40 at t718.

Figure 8:
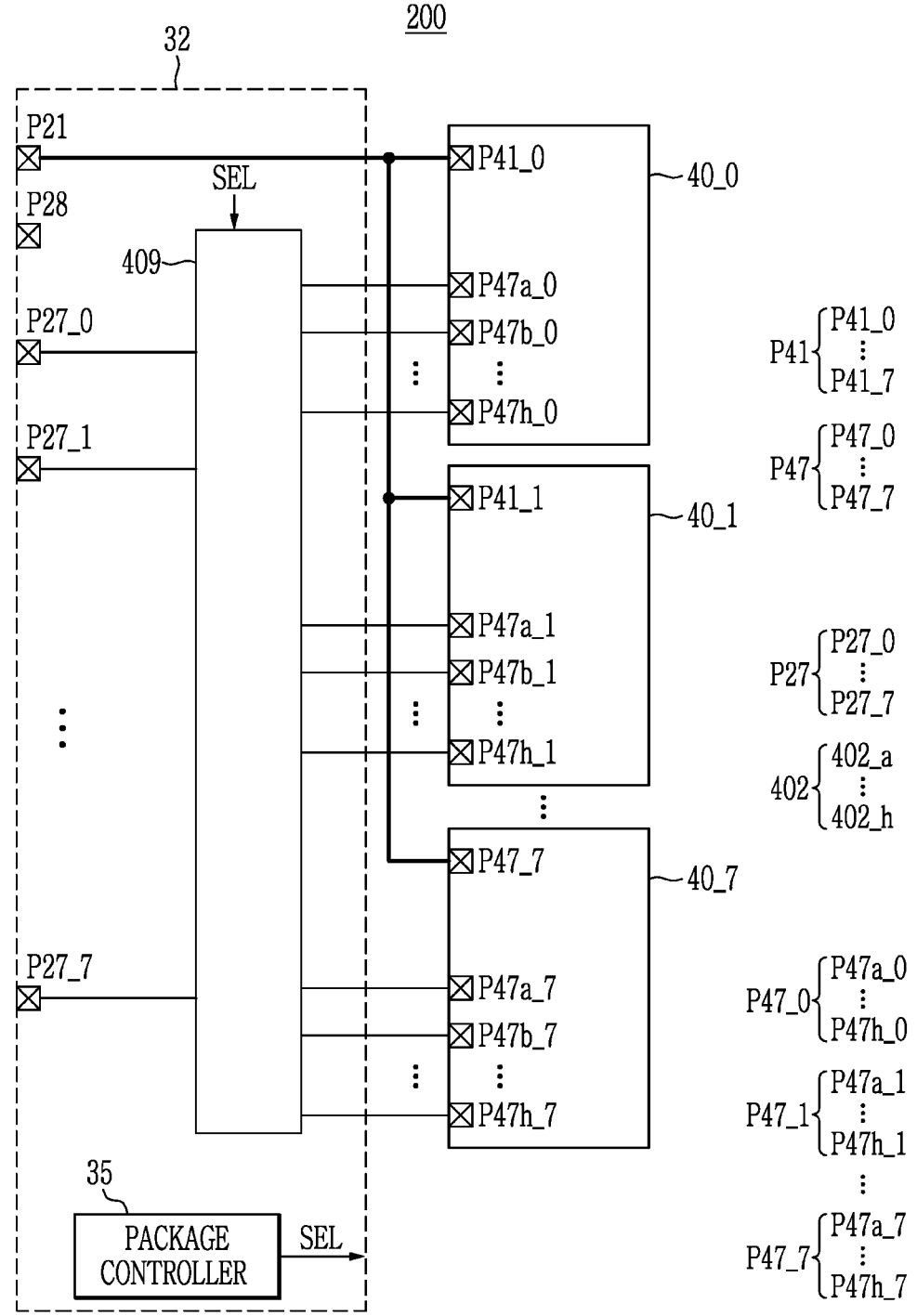
FIG. 8 illustrates a memory package according to an example embodiment.

FIG. 8 illustrates a memory package according to an example embodiment.

FIG. 8 illustrates a connection relationship between an interface circuit 32 and a plurality of memory devices 40 in a memory package 200.

In FIG. 8, it is assumed that one memory package 200 includes eight memory devices (40_0, 40_1, . . . , 40_7). The present disclosure is not limited thereto, and one memory package 200 may include any number of memory devices.

Each of the plurality of memory devices 40 may include first pins (P41_0, P41_1, . . . , P41_$n$) and a plurality of data pins (P47_0, P47_1, . . . , P47_$n$). FIG. 8 illustrates that one memory device, for example, the memory device 40_0, includes eight data pins (P47$a$_0, P47$b$_0, . . . , P47$h$_0), but the present disclosure is not limited thereto, and each of the plurality of memory devices 40 may include an arbitrary number of data pins. Because the plurality of memory devices 40 in the memory package 200 do not include a pin indicating status data of each memory device, a separate command CMD may be required to detect status data of each of the plurality of memory devices 40.

Hereinafter, descriptions of the memory device 40_0 may be equally applied to each of the memory devices 40.

In some example embodiments, the memory controller 10 may transmit a status read command to the plurality of memory devices 40. In response to the status read command, at least one of the plurality of memory devices 40 may output status data of the corresponding memory device to the memory controller 10. In another example embodiment, the memory controller 10 may transmit an error read command to the plurality of memory devices 40. In response to the error read command, at least one of the plurality of memory devices 40 may output error data of the corresponding memory device to the memory controller 10.

For example, the memory device 400 may output status data of the memory device 40_0 through the seventh pin P47a_0 and error data of the memory device 400 through the seventh pin P47g_0. However, the present disclosure is not limited thereto, and the memory device 40_0 may output status data and error data through an arbitrary data pin.

As shown in FIG. 8, the interface circuit 32 may include a sixth selector 409.

The interface circuit 32 may receive the chip enable signal CE from the memory controller 10 through the first pin P21. The first pin P21 may be connected to a plurality of first pins (P41_0, P41_1, ..., P41_n; P41) of the plurality of memory devices 40.

The interface circuit 32 may receive the data signal DQ from the memory controller (10 in FIG. 1) through a plurality of seventh pins (P27_0, P27_1, ..., P27_7; P27). Alternatively, the interface circuit 30 may output data DATA from each of the plurality of memory devices 40 through the plurality of seventh pins P27.

The plurality of memory devices 40 may receive the chip enable signal CE and the plurality of data signals DQ from the interface circuit 32. The plurality of memory devices 40 may derive the command CMD and/or the address ADDR based on the received data signal DQ. The package controller 35 may generate a selection signal SEL for controlling the sixth selector 409 based on the command CMD.

The interface circuit 30 may output status data and/or error data of the plurality of memory devices 40 through the plurality of seventh pins P27.

The sixth selector 409 may select eight signals outputted from the plurality of data pins (P47a_0, P47b_0, ..., P47h_0; P47a_1, P47b_1, ..., P47b_h; P47a_n, P47b_n, ..., P47h_n) based on the selection signal SEL, and may respectively connect the selected signals to the plurality of seventh pins P27. In some example embodiments, the sixth selector 409 may include a number of input pins corresponding to the number of output pins of the plurality of memory devices 40 disposed within one memory package 200. In some example embodiments, the sixth selector 409 may be configured as a multiplexer.

In some example embodiments, the package controller 35 may generate a selection signal SEL based on corresponding information between pins of the plurality of memory devices 40 and input pins of the sixth selector 409. For example, the package controller 35 may include a memory storing corresponding information about which output of a plurality of outputs of the plurality of memory devices 40 is inputted to each input pin of the sixth selector 409. The sixth selector 409 may select and output as many signals as the number of output pins (that is, the seventh pins (P27_0, P27_1, ..., P27_7)) among the signals inputted through the input pins based on the selection signal SEL. The sixth selector 409 may output the selected output signal to the memory controller 10 through the seventh pin P27.

In some example embodiments, the plurality of memory devices 40 may receive a command CMD that does not include a separate die selection command CEBR.

For example, the memory controller 10 may transmit an entire status read command CMD to each of the plurality of memory devices 40. A control logic 52 may control the sixth selector 409 so that signals outputted from the first data pins (P47a_0, P47a_1, ..., P47a_n) of each of the plurality of memory devices 40 are outputted to the plurality of seventh pins P27.

As another example, the memory controller 10 may transmit the entire error read command CMD to each of the plurality of memory devices 40. The control logic 52 may control the sixth selector 409 so that signals outputted from the seventh data pins (P47g_0, P47g_1, ..., P47g_n) of each of the plurality of memory devices 40 are outputted to the plurality of seventh pins P27.

Figure 9:
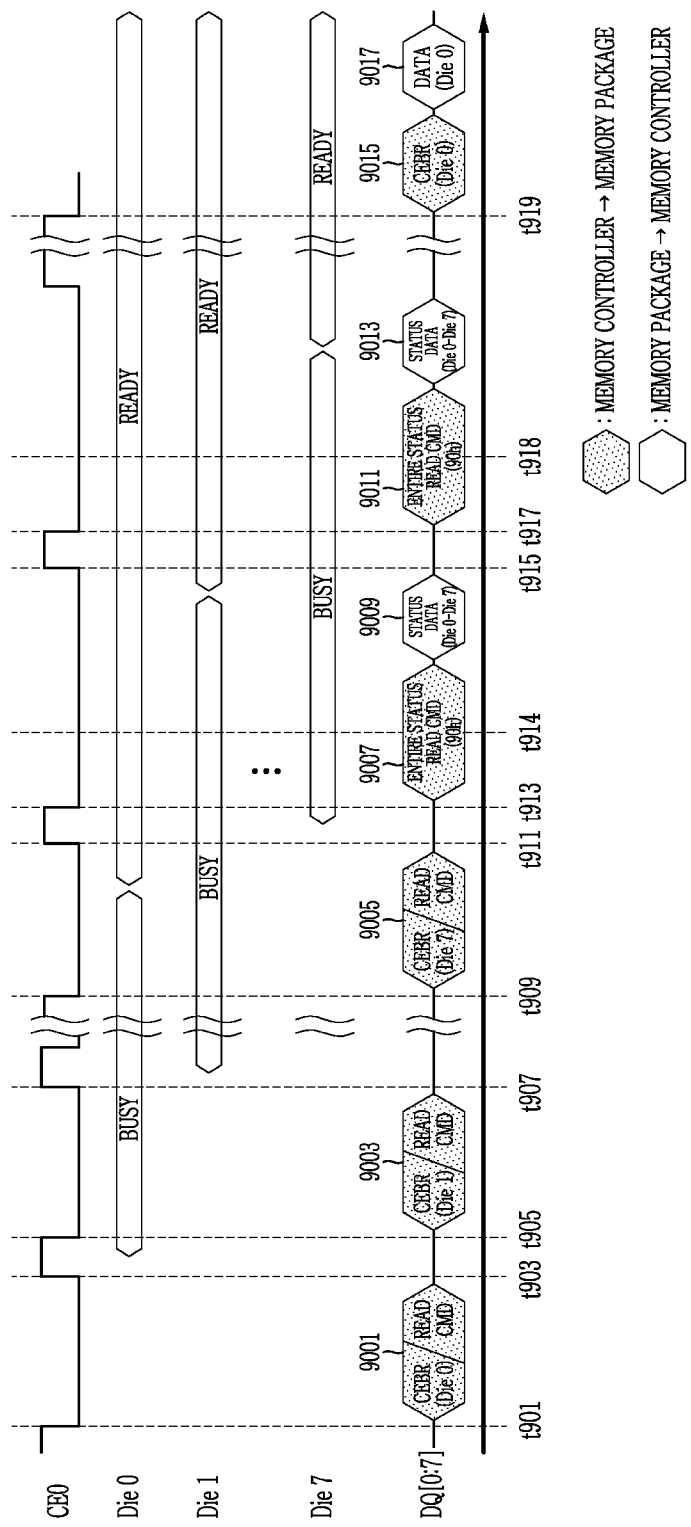
FIG. 9 illustrates a timing diagram of a chip enable signal of a memory package, a ready/busy status of a memory package, and a data signal according to an example embodiment.

FIG. 9 illustrates a timing diagram of a chip enable signal of a memory package, a ready/busy status of a memory package, and a data signal according to FIG. 8.

Specifically, FIG. 9 illustrates a chip enable signal CE0, a data signal DQ transmitted to the interface circuit 30 in the memory package 200 selected by the chip enable signal CE0, and a ready/busy state of each of the plurality of memory devices 40 in the selected memory package 200. Hereinafter, descriptions of the memory device 40_0 may be equally applied to each of the memory devices 40.

In addition, the memory controller 10 may transmit a read command together with the read enable signal (nRE in FIG. 2), and in response to this, the memory interface 41_0 of the memory device 400 may transmit the data DATA to the memory controller 10 by aligning with the toggle timing of the data strobe signal DQs based on the read enable signal nRE.

First, at t901, the chip enable signal CE0 transitions to an enable level (for example, a low level). The memory controller 10 may select the memory package 100 through the chip enable signal CE0.

While the chip enable signal CE0 is maintained at the low level, the memory controller 10 may transmit the command CMD through the plurality of data signals DQ. The memory controller 10 may transmit a first command 9001 to the memory package 200 through the data signal DQ. In this case, the memory package 200 may be a memory package selected by the chip enable signal CE0. The first command 9001 may include a die selection signal CEBR and a read command for selecting die 0. The package controller 35 may generate a selection signal SEL for controlling the sixth selector 409 to output an input of the seventh pin P47 of the memory device 40_0 based on the command CMD and corresponding information.

Thereafter, in response to receiving the read command within the first command 9001, the memory device 40_0 may perform an internal operation for preparing data corresponding to the received first command 9001. That is, the memory device 40_0 may be in a busy state.

At t903, the chip enable signal CE0 may transition from a low level to a high level.

At t905, the chip enable signal CE0 may transition from a high level to a low level. While the chip enable signal CE0 is maintained at the low level, the memory controller 10 may transmit a second command 9003 to the memory package 200 through the data signal DQ. The second command 9003 may include a die selection signal CEBR and read command for selecting die 1. The package controller 35 may generate a selection signal SEL for controlling the sixth selector 409 to receive and output an input of the seventh pin P47 of the memory device 40_1 based on the die selection signal CEBR and corresponding information.

In response to receiving the read command within the second command 9003, the memory device 40_1 may perform an internal operation for preparing data corresponding to the received second command 9003. Accordingly, the memory device 40_1 may be in a busy state.

At t907, the chip enable signal CEO may transition from a low level to a high level.

At t909, the chip enable signal CEO may transition from a high level to a low level. While the chip enable signal CEO is maintained at the low level, the memory controller 10 may transmit a third command 9005 to the memory package 200 through the data signal DQ. The third command 9005 may include a die selection signal CEBR and a read command for selecting die 7. The package controller 35 may generate a selection signal SEL for controlling the sixth selector 409 to receive and output an input of the seventh pin P47 of the memory device 40_7 based on the die selection signal CEBR and corresponding information.

In response to receiving the read command within the third command 9005, the memory device 40_7 may perform an internal operation for preparing data corresponding to the received third command 9005. Accordingly, the memory device 407 may be in a busy state.

At t911, the chip enable signal CEO may transition from a low level to a high level.

At t913, the chip enable signal CEO may transition from a high level to a low level. While the chip enable signal CEO is maintained at the low level, the memory controller 10 may transmit a fourth command 9007 to the memory package 200 through the data signal DQ. The fourth command 9007 may include an entire status read command 90h. The package controller 35 may generate a selection signal SEL based on the command CMD and corresponding information. In this case, the selection signal SEL may be a signal that controls the sixth selector 409 so that signals inputted through the input pins of the sixth selector 409 corresponding to the first data pins (P47a_0, P47a_1, . . . , P47a_n) of the plurality of memory devices 40 are outputted through the seventh pins (P27_0, P27_1, . . . , P27_7).

In some example embodiments, the memory device 400 may output status data indicating the status of the memory device 40_0 at a time point of receiving the read status command 90h (for example, t914).

In some example embodiments, the plurality of memory devices 40 may output entire status data 9009 in response to receiving the fourth command 9007. The entire status data 9009 may indicate the status of each of the memory devices (40_0, 40_1, . . . , 40_7) at t914. Specifically, because the memory device 400 is in a ready state, the seventh pin P27_0 may output a bit (for example, 1) indicating the ready state. Because the memory devices (40_1, . . . , 40_7) at t914 are in a busy state, the seventh pin (P27_1, . . . , P27_7) may output a bit (for example, 0) indicating the busy state.

The memory controller 10 may detect status data of each of the memory devices 40 based on the entire status data 9009 outputted from the memory package 200 in response to the fourth command 9007.

Subsequently, at t915, the chip enable signal CEO may transition from a low level to a high level.

At t917, the chip enable signal CEO may transition from a high level to a low level. While the chip enable signal CEO is maintained at the low level, the memory controller 10 may transmit a fifth command 9011 to the memory package 200 through the data signal DQ. The fifth command 9011 may include an entire status read command 90h. The package controller 35 may generate a selection signal SEL based on the command CMD and corresponding information. For example, the selection signal SEL may be a signal that controls the sixth selector 409 so that signals inputted through the input pins of the sixth selector 409 corresponding to the first data pins (P47a_0, P47a_1, . . . , P47a_n) of the plurality of memory devices 40 are outputted through the seventh pins (P27_0, P27_1, . . . , P27_7).

In some example embodiments, the plurality of memory devices 40 may output the entire status data 9009 in response to receiving the fifth command 9011. The entire status data 9009 may indicate the status of the memory devices (40_0, 40_1, . . . , 40_7) at t918. Specifically, because the memory devices 40_0 and 40_1 are in a ready state, the seventh pins P27_0 and P27_1 may output a bit (for example, 1) indicating the ready state. Because the memory devices (40_2, . . . , 40_7) at t914 are in a busy state, the seventh pin (P27_2, . . . , P27_7) may output a bit (for example, 0) indicating the busy state.

Then, at t919, the chip enable signal CEO may transition from a high level to a low level. While the chip enable signal CEO is maintained at the low level, the memory controller 10 may transmit a sixth command 9015 to the memory package 200 through the data signal DQ. The sixth command 9015 may include a die selection signal CEBR for selecting die 0. The package controller 35 may generate a selection signal SEL based on the die selection signal CEBR and corresponding information. For example, the selection signal SEL may be a signal that controls the sixth selector 409 so that signals inputted through the input pins of the sixth selector 409 corresponding to the first data pins (P47a_0, P47a_1, . . . , P47a_n) of the memory device 40_0 are outputted through the seventh pins (P27_0, P27_1, . . . , P27_7).

Then, the memory device 40_0 may output data 9017 corresponding to the first command 9001 through the seventh pin P47_0. The interface circuit 32 may output data outputted from the memory device 40_0 as the data 9017 through the sixth selector 409 and the plurality of seventh pin P27.

Figure 10:
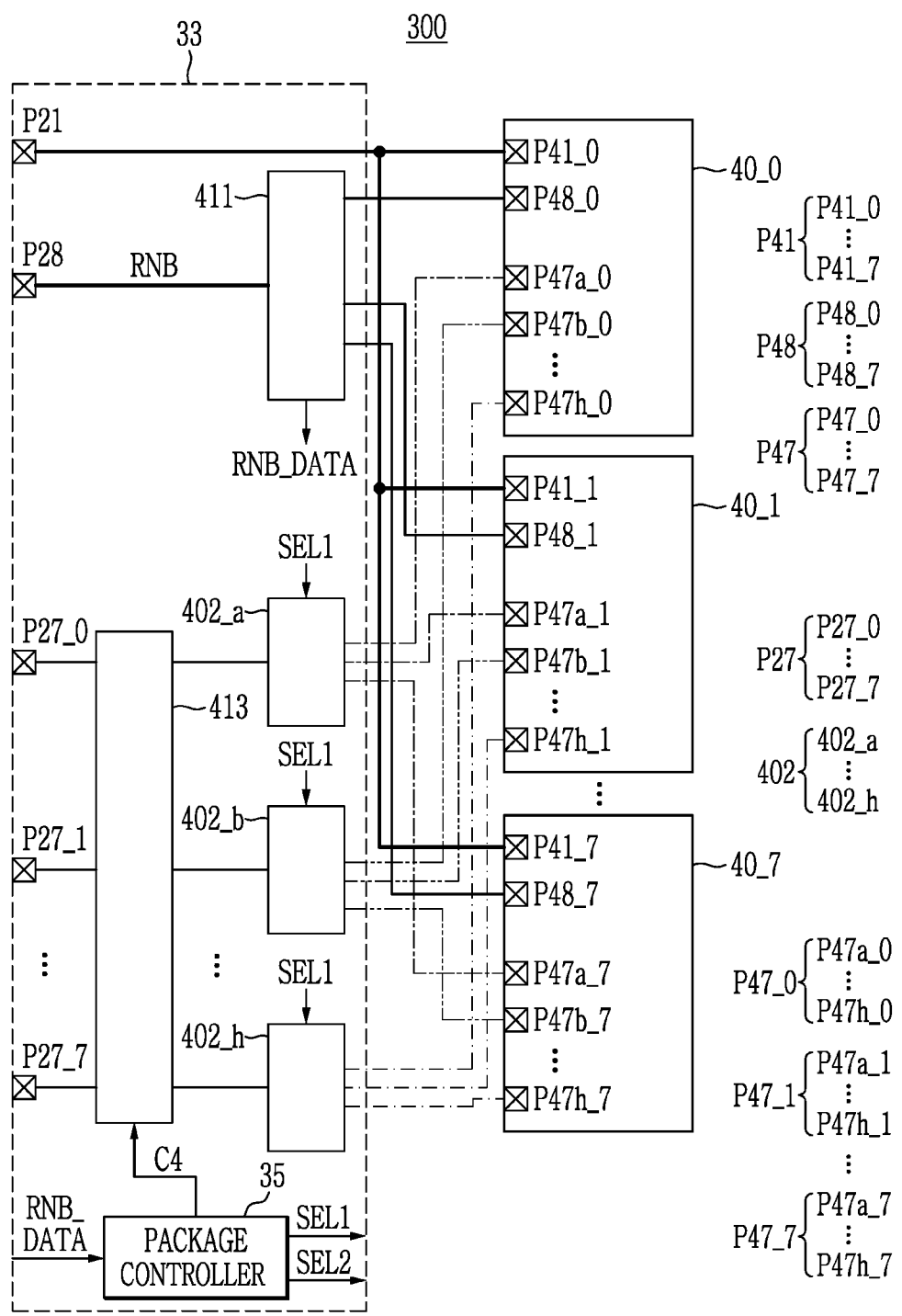
FIG. 10 illustrates a memory package according to an example embodiment.

FIG. 10 illustrates a memory package according to an example embodiment.

FIG. 10 illustrates a connection relationship between the interface circuit 33 and the plurality of memory devices 40 in a memory package 300.

In FIG. 10, it is assumed that one memory package 300 includes eight memory devices (40_0, 40_1, . . . , 40_7). The present disclosure is not limited thereto, and one memory package 300 may include any number of memory devices.

Each of the plurality of memory devices 40 may include first pins (P41_0, P41_1, . . . , P41_n; P41), a plurality of data pins (P47_0, P47_1, . . . , P47_n; P47), and eighth pins (P48_0, P48_1, . . . , P48_n; P48). FIG. 10 illustrates that one memory device, for example, the memory device 40_0 includes eight data pins (P47a_0, P47b_0, . . . , P47h_0), but the present disclosure is not limited thereto, and each of the plurality of memory devices 40 may include an arbitrary number of data pins.

Hereinafter, descriptions of the memory device 40_0 may be equally applied to each of the memory devices 40.

As shown in FIG. 10, the interface circuit 33 may include a plurality of second selectors 402 (402_a, 402_b, . . . , 402_h), a seventh selector 411, and an eighth selector 413.

The interface circuit 33 may receive the chip enable signal CE from the memory controller 10 through the first pin P21. The first pin P21 may be connected to a plurality of first pins P41 of the plurality of memory devices 40.

The interface circuit 33 may receive the data signal DQ from the memory controller 10 through a plurality of seventh pins P27. Alternatively, the interface circuit 33 may output data DATA from each of the memory devices 40_m through the plurality of seventh pins P27.

The plurality of memory devices 40 may receive the chip enable signal CE and the plurality of data signals DQ from the interface circuit 33. The package controller 35 may generate a first selection signal SEL1 for controlling a plurality of second selectors 402.

The seventh selector 411 may receive a ready/busy signal from the eighth pin P48 of the plurality of memory devices 40. The seventh selector 411 may generate RNB data RNB_DATA based on the received ready/busy signal. The seventh selector 411 may transmit the RNB data RNB_DATA to the package controller 35. The package controller 35 may generate a fourth signal C4 for controlling the eighth selector 413 based on the command CMD and the RNB data RNB_DATA. The fourth signal C4 may control the output received from the plurality of second selectors 402 to be output through the plurality of seventh pins P27, or may control the eighth selector 413 so that the eighth selector 413 may output data included in the fourth signal C4.

The interface circuit 33 may output a ready/busy signal received from the plurality of memory devices 40 through the eighth pin P28.

In some example embodiments, the plurality of memory devices 40 may receive a command CMD including a die selection command CEBR. For example, the memory controller 10 may transmit a status read command CMD including a die selection command CEBR indicating the memory device 40_0 to the memory device 40_0.

The seventh selector 411 may be connected to a plurality of eighth pins P48 of each of the plurality of memory devices 40. The seventh selector 411 may output a value of "1" to the eighth pin P28 when one or more of the plurality of memory devices 40 is in a ready state (for example, when one or more of the outputs received from the plurality of eighth pins P48 has a value of "1"). In some example embodiments, the seventh selector 411 may be configured as an OR circuit.

In some example embodiments, the plurality of memory devices 40 may receive a command CMD including a die selection command CEBR. For example, the memory controller 10 may transmit a read command CMD including a die selection command CEBR indicating the memory device 40_0 to the memory device 40_0.

Each of the plurality of memory devices 40 may control the second selectors (402_a, 402_b, . . . , 402_h) and the eighth selector 413 so that the signals outputted from the plurality of memory devices 40 are outputted to the seventh pins (P27_0, P27_1, . . . , P27_7).

The plurality of second selectors 402 may be connected to data pins of each of the plurality of memory devices 40. In addition, the plurality of second selectors 402 may be connected to each of the plurality of seventh pins (P27_0, P27_1, . . . , P27_7) of the interface circuit 33. In some example embodiments, each of the plurality of second selectors 402 may be configured as a multiplexer.

The eighth selector 413 may be connected to the plurality of second selectors 402. The eighth selector 413 may be connected to the plurality of seventh pins P27. In some example embodiments, the eighth selector 413 may connect the plurality of seventh pins P27 to the output of the plurality of second selectors 402 based on the fourth signal C4. For example, the second selector 402_a may be connected to the first data pin of each of the plurality of memory devices 40. The second selector 402_a may select one of the outputs received from the plurality of first data pins based on the first selection signal SEL1 and output the selected signal to the eighth selector 413. Alternatively, the second selector 402_a may output the data signal DQ received through the seventh pin P27_0 to the first data pin of the memory device selected based on the first selection signal SEL1.

As another example, the second selector 402_h may be connected to the eighth data pin of each of the plurality of memory devices 40. The second selector 402_h may select one of the outputs received from the plurality of eighth data pins based on the first selection signal SEL1 and output the selected signal to the eighth selector 413. Alternatively, the second selector 402_h may output the data signal DQ received through the seventh pin P27_7 to the eighth data pin of the memory device selected based on the first selection signal SEL1.

In another example embodiment, the eighth selector 413 may output data in the fourth signal C4 to the plurality of seventh pins P27 based on the fourth signal C4.

For example, the package controller 35 may receive the ready/busy data RNB_DATA from the seventh selector 411 and generate the fourth signal C4 based on the received ready/busy data RNB_DATA. The ready/busy data RNB_DATA may include status data of each of the plurality of memory devices 40. A control logic 53 may detect information about memory devices in a ready state among the plurality of memory devices 40 based on the received ready/busy data RNB_DATA, and may generate the fourth signal C4 indicating the number of the memory devices in the ready state and information about the memory devices. The control logic 53 may transmit the generated fourth signal C4 to the eighth selector 413. The eighth selector 413 may sequentially output the number of the memory devices in the ready state and the information indicating the corresponding memory devices based on the fourth signal C4.

Figure 11:
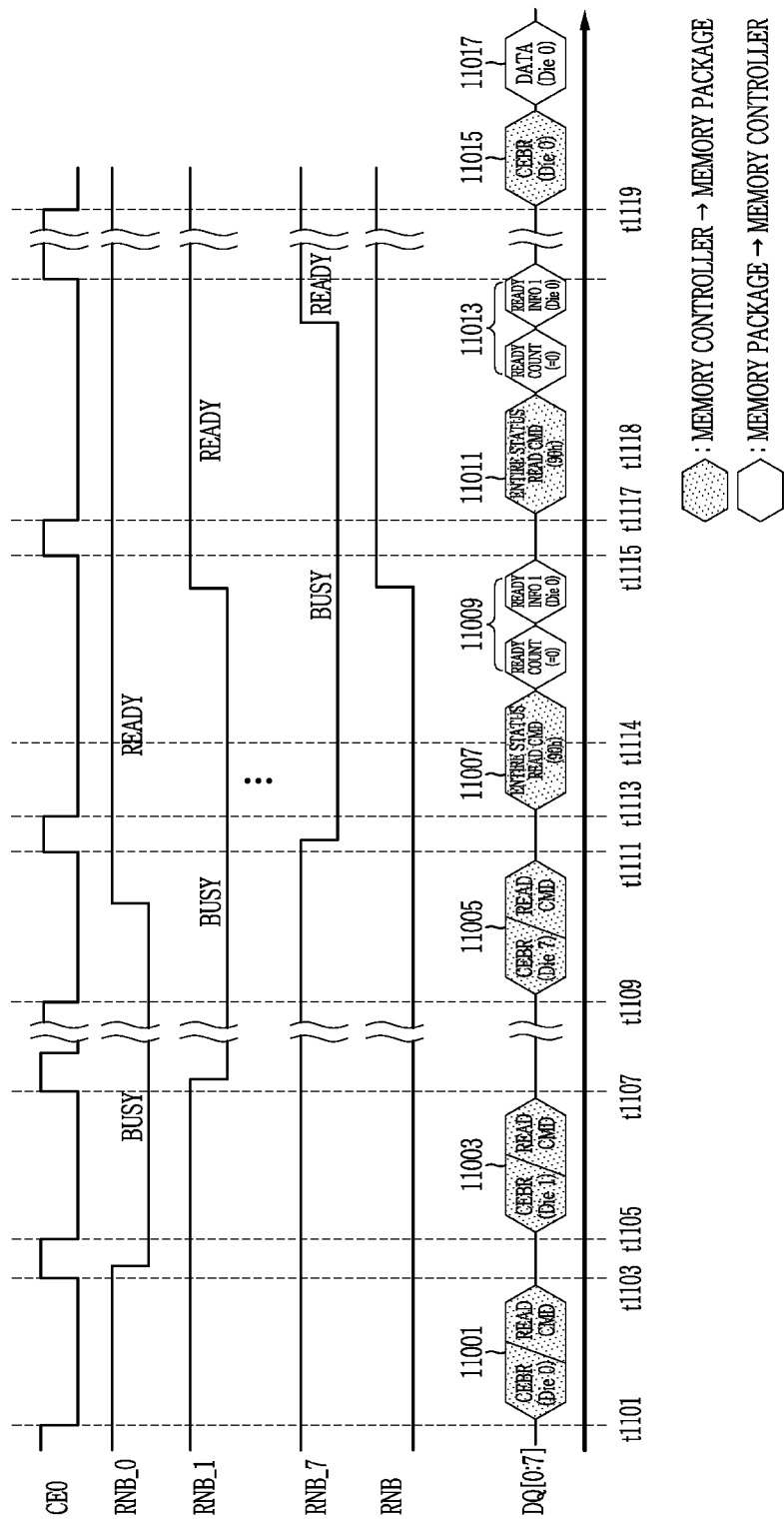
FIG. 11 illustrates a timing diagram of a chip enable signal, a ready/busy signal of a memory device, a total ready/busy signal, and a data signal according to an example embodiment.

FIG. 11 illustrates a timing diagram of a chip enable signal, a ready/busy signal of a memory device, a total ready/busy signal, and a data signal according to FIG. 10.

Specifically, FIG. 11 illustrates a chip enable signal CE0, ready/busy signals (RNB_0, RNB_1, . . . , RNB_7) respectively outputted from a plurality of memory devices 40 in a memory package 20 selected by the chip enable signal CE0, a total ready/busy signal RNB, and a data signal DQ transmitted to the plurality of memory devices 40 through an interface circuit 30. Hereinafter, descriptions of the memory device 40_0 may be equally applied to each of the memory devices 40.

In some example embodiments, the ready/busy signal RNB_0 may indicate the status of the memory device 40_0. That is, the ready/busy signal RNB_0 may be a signal outputted from the eighth pin P48_0 of the memory device 40_0. When the ready/busy signal RNB_0 is at a low level, the memory device 40_0 may indicate a busy state, and when the ready/busy signal RNB_0 is at a high level, the memory device 40_0 may indicate a ready state.

The total ready/busy signal RNB may be determined by the package controller 35 based on each of the ready/busy signals (RNB_0, RNB_1, . . . , RNB_7).

In addition, the memory controller (10 in FIG. 1) may transmit a read command together with the read enable signal (nRE in FIG. 2), and in response to this, the memory interface 41_0 of the memory device 40_0 may transmit the data DATA to the memory controller 10 by aligning with the toggle timing of the data strobe signal DQs based on the read enable signal nRE.

First, at t1101, the chip enable signal CEO transitions to an enable level (for example, a low level). The memory controller 10 may select the memory package 20 through the chip enable signal CEO.

While the chip enable signal CEO is maintained at the low level, the memory controller 10 may transmit the command CMD through the plurality of data signals DQ. The memory controller 10 may transmit a first command 11001 to the memory package 300 through the data signal DQ. In this case, the memory package 300 may be a memory package selected by the chip enable signal CEO. The first command 11001 may include a die selection signal CEBR and a read command for selecting die 0. The package controller 35 may generate a first selection signal SEL1 and a fourth signal C4 for connecting the memory controller 10 and the memory device 40_0 based on the die selection signal CEBR. The first selection signal SEL1 may be a signal for connecting the plurality of second selectors 402 to the seventh pin P47_0 of the memory device 40_0. The fourth signal C4 may be a signal for controlling the eighth selector 413 to connect the plurality of second selectors 402 and the seventh pin P27.

In response to receiving the read command within the first command 11001, the memory device 400 may perform an internal operation for preparing data corresponding to the received first command 11001. That is, the memory device 40_0 may be in a busy state. Accordingly, the ready/busy signal RNB_0 indicating the status of the memory device 40_0 may transition to a low level indicating the busy state after a predetermined period after receiving the first command 11001.

At t1103, the chip enable signal CEO may transition from a low level to a high level.

At t1105, the chip enable signal CEO may transition from a high level to a low level. While the chip enable signal CEO is maintained at the low level, the memory controller 10 may transmit a second command 11003 to the memory package 300 through the data signal DQ. The second command 11003 may include a die selection signal CEBR and read command for selecting die 1. The package controller 35 may generate a first selection signal SEL1 and a fourth signal C4 for connecting the memory controller 10 and the memory device 40_1 based on the die selection signal CEBR. The first selection signal SEL1 may be a signal for connecting the plurality of second selectors 402 to the seventh pin P47_0 of the memory device 40_1. The fourth signal C4 may be a signal for controlling the eighth selector 413 to connect the plurality of second selectors 402 and the seventh pin P27.

In response to receiving the read command within the second command 11003, the memory device 40_1 may perform an internal operation for preparing data corresponding to the received second command 11003. Accordingly, the ready/busy signal RNB_1 indicating the status of the memory device 401 may transition to a low level after a predetermined period after receiving the second command 11003.

At t1107, the chip enable signal CEO may transition from a low level to a high level.

At t1109, the chip enable signal CEO may transition from a high level to a low level. While the chip enable signal CEO is maintained at the low level, the memory controller 10 may transmit a third command 11005 to the memory package 300 through the data signal DQ. The third command 11005 may include a die selection signal CEBR and a read command for selecting die 7. The package controller 35 may generate a first selection signal SEL1 and a fourth signal C4 for connecting the memory controller 10 and the memory device 40_7 based on the die selection signal CEBR. The first selection signal SEL1 may be a signal for connecting the plurality of second selectors 402 to the seventh pin P47_0 of the memory device 40_7. The fourth signal C4 may be a signal for controlling the eighth selector 413 to connect the plurality of second selectors 402 and the seventh pin P27.

In response to receiving the read command within the third command 11005, the memory device 407 may perform an internal operation for preparing data corresponding to the received third command 11005. Accordingly, the ready/busy signal RNB_7 indicating the status of the memory device 407 may transition to a low level after a predetermined period after receiving the third command 11005.

At t1111, the chip enable signal CEO may transition from a low level to a high level.

At t1113, the chip enable signal CEO may transition from a high level to a low level. While the chip enable signal CEO is maintained at the low level, the memory controller 10 may transmit a fourth command 11007 to the memory package 300 through the data signal DQ. The fourth command 11007 may include an entire status read command 90*h*. The seventh selector 411 may generate ready/busy signal data RNB_DATA based on the status data of each of the plurality of memory devices 40 outputted from the eighth pin P48 of each of the plurality of memory devices 40. The package controller 35 may generate the fourth signal C4 based on the ready/busy signal data RNB_DATA. Specifically, the package controller 35 may detect that the memory device 40_0 of the plurality of memory devices 40 is in a ready state based on the ready/busy signal data RNB_DATA. Then, the package controller 35 may generate the fourth signal C4 including information that the number of the memory devices in the ready state (READY COUNT) is 1 and corresponding memory device information (READY INFO) is the memory device 40_0.

Accordingly, the package controller 35 may control the eighth selector 413 so that the eighth selector 413 may output the number of the memory devices (READY COUNT) in the ready state in the fourth signal C4 and the corresponding memory device information (READY INFO) through the seventh pin P27.

In some example embodiments, the memory device 400 may output status data indicating the status of the memory device 40_0 at a time point of receiving the read status command 90*h* (for example, t1114).

In some example embodiments, the package controller 35 may generate the fourth control signal C4 so that the eighth selector 413 may output ready data 11009 through the plurality of seventh pins P27 in response to receiving the fourth command 11007. The ready data 11009 may include information indicating the number of memory devices of the plurality of memory devices 400, 40_1, . . . , 40_7 in the ready state (READY COUNT) and the corresponding memory device (that is, the memory device 40_0) (READY INFO).

The memory controller 10 may detect status data of each of the memory devices 40 based on the ready data 11009 outputted from the memory package 100 in response to the fourth command 11007.

When receiving the entire status read command CMD, if any memory device among the plurality of memory devices 40 is not in the ready state, the eighth selector 413 may generate the fourth signal C4 including information indicating that the number of the memory devices in the ready state (READY COUNT) is 0.

When receiving the entire status read command CMD, if a plurality of memory devices among the plurality of memory devices 40 are in the ready state, the eighth selector 413 may generate the fourth signal C4 indicating the number of the memory devices in the ready state (READY COUNT) and information about the corresponding memory devices. In some example embodiments, the information about the corresponding memory device may be listed according to a time during which the ready state is maintained. When the time required to prepare data is similar for each memory device, the information about the corresponding memory device may be listed according to the order in which read commands are received. For example, the memory controller may sequentially transmit the read command to the memory device 40_0 and the memory device 40_1. In this case, the memory device 40_0 and the memory device 40_1 may be maintained at a busy state in response to the read command. Because the memory device 40_0 receives the read command earlier than the memory device 40_1, the memory device 400 may be in a ready state earlier. Accordingly, in this case, the fourth signal C4 may include information indicating the memory device 40_1 after information indicating the memory device 40_0.

At t1115, the chip enable signal CEO may transition from a low level to a high level.

At t1117, the chip enable signal CEO may transition from a high level to a low level. While the chip enable signal CEO is maintained at the low level, the memory controller 10 may transmit a fifth command 11011 to the memory package 300 through the data signal DQ. The fifth command 11011 may include an entire status read command 90h. The package controller 35 may generate the fourth signal C4 including information that the number of the memory devices (READY COUNT) in the ready state among the memory devices for which status information has not been checked is 1 and the corresponding memory device information (READY INFO) is the memory device 40_1.

Accordingly, the package controller 35 may control the eighth selector 413 so that the number of the memory devices (READY COUNT) in the ready state in the fourth signal C4 and the corresponding memory device information (READY INFO) may be outputted through the seventh pin P27.

In some example embodiments, the package controller 35 may generate the fourth control signal C4 so that the eighth selector 413 may output ready data 11013 through the plurality of seventh pins P27 in response to receiving the fifth command 11011. The ready data 11013 may include information about a memory device in a ready state among the plurality of memory devices (40_0, 40_1, ..., 40_7). The ready data 11013 may indicate memory devices (40_1, 40_1, ..., 40_7) whose status data has not been checked among the statuses of the memory devices (40_0, 40_1, ..., 40_7) at t1118.

The memory controller 10 may detect status data of each of the memory devices 40 based on the ready data 11013 outputted from the memory package 300 in response to the fifth command 11011. The memory package 300 may output the ready data 11013 in response to receiving the fifth command 11011. The ready data 11013 may indicate the status of the memory devices (40_0, 40_1, ..., 40_7) at t1118. Specifically, because the memory devices 40_0 and 40_1 are in a ready state, the seventh pins P27_0 and P27_1 may output a bit (for example, 1) indicating the ready state. Because the memory devices (40_2, ..., 40_7) at t1118 are in a busy state, the seventh pin (P27_2, ..., P27_7) may output a bit (for example, 0) indicating the busy state.

Then, at t1119, the chip enable signal CEO may transition from a high level to a low level. While the chip enable signal CEO is maintained at the low level, the memory controller 10 may transmit a sixth command 11015 to the memory package 300 through the data signal DQ. The sixth command 11015 may include a die selection signal CEBR for selecting die 0. The package controller 35 may generate a first selection signal SEL1 and a fourth signal C4 for connecting the memory controller 10 and the memory device 40_0 based on the die selection signal CEBR and the ready/busy signal data RNB_DATA. For example, the first selection signal SEL1 may be a signal for connecting the plurality of second selectors 402 to data pins of the memory device 40_0. In addition, the fourth signal C4 may be a signal for controlling the eighth selector 413 to connect the plurality of second selectors 402 to the seventh pin P27.

Then, the memory device 40_0 may output data 11017 corresponding to the first command 11001 through the seventh pin P47_0. The interface circuit 33 may output the data outputted from the memory device 40_0 as the data 11017 through the eighth selector and the plurality of second selectors 402.

Figure 12:
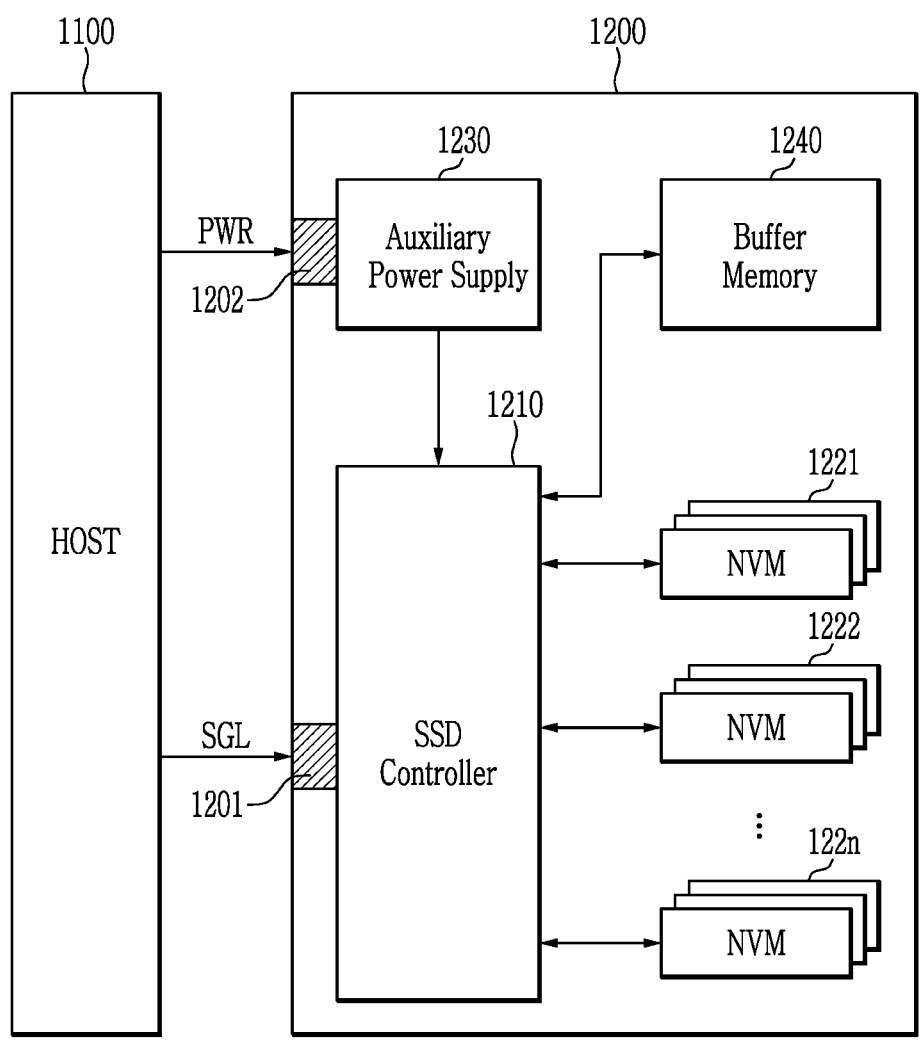
FIG. 12 illustrates a block diagram of an SSD system according to an example embodiment.

FIG. 12 illustrates a block diagram of an SSD system according to an example embodiment.

Referring to FIG. 12, an SSD system 1000 may include a host 1100 and a SSD 1200. The SSD 1200 transmits and receives signals to/from the host 1100 through a signal connector (e.g., interface), and receives a power source through a power connector (e.g., interface). The SSD 1200 may include an SSD controller 1210, an auxiliary power supply 1230, a buffer memory 1240, and memory devices (1221, 1222, ..., 122n). The memory devices (1221, 1222, ..., 122n) may be NAND flash memory devices. In some example embodiments, the arbitrary memory devices (1221, 1222, ..., 122n) may include the interface circuits according to FIG. 1 to FIG. 11.

In this case, the SSD controller 1210 may transmit an entire status read command to all of a plurality of memory devices (1221, 1222, ..., 122n) to detect the status of each of the plurality of memory devices (1221, 1222, ..., 122n). In addition, the plurality of memory devices 1221, 1222, ..., 122n may each output status data in response to the entire status read command. The SSD controller 1210 may receive status data from the plurality of memory devices (1221, 1222, ..., 122n). The SSD controller 1210 may output status data of each of the plurality of memory devices 1221, 1222, ..., 122n as one entire status data to the host 1100 through a plurality of data pins.

In related devices, the SSD controller may detect the status of one memory device at a time by transmitting a status read command together with one die selection signal. That is, the SSD controller requires n die selection signals and n status read commands in order to detect the statuses of all of the plurality of memory devices.

However, because the SSD controller 1210 according to example embodiments of the present disclosure may detect the status data of all of the plurality of memory devices (1221, 1222, ..., 122n) by using the entire status read command, fast data processing between the SSD controller 1210 and the plurality of memory devices (1221, 1222, ..., 122n) is possible. In addition, the SSD controller 1210 according to the example embodiment of the present disclosure outputs the status data of the plurality of memory devices 1221, 1222, ..., 122n through existing data pins, thereby enabling fast data processing without adding new pins.

In some example embodiments, each of the components represented by a block as illustrated in FIGS. 1-3, 5, 8, 10 and 12 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A storage device comprising:
a plurality of memory devices configured to output status data indicating a busy state indicating an internal operation is being performed or a ready state in response to a first command, and output error data indicating whether an error occurs in an internal configuration in response to a second command; and
an interface circuit configured to receive the first command and the second command, receive the status data of each of the plurality of memory devices from the plurality of memory devices based on the first command, and output entire status data indicating statuses of the plurality of memory devices based on the status data of each of the plurality of memory devices,
wherein n is an integer greater than 1,
wherein the plurality of memory devices comprises n memory devices,
wherein each of the plurality of memory devices comprises a status output pin through which the status data is output, and an error output pin, and
wherein the interface circuit comprises:
n output pins; and
a first multiplexer configured to selectively connect the status output pin of each of the plurality of memory devices and the n output pins in response to the first command, and connect the error output pin of each of the plurality of memory devices and the n output pins in response to the second command.

2. The storage device of claim 1, wherein each of the plurality of memory devices is configured to, in response to receiving the second command, output error data through the error output pin, and
wherein the interface circuit comprises a second selector that is connected between the first multiplexer and the n output pins, and is configured to selectively connect the error output pin of each of the plurality of memory devices and the n output pins in response to the second command.

3. The storage device of claim 1, wherein each of the plurality of memory devices comprises a plurality of data pins, and is configured to, in response to receiving a third command requesting data stored in the plurality of memory devices, output read data through the plurality of data pins, and
wherein the interface circuit comprises a plurality of third selectors connected to the plurality of data pins and configured to be controlled by a second selection signal, and a fourth selector configured to selectively connect the plurality of third selectors and the plurality of data pins in response to a first control signal.

4. The storage device of claim 3, wherein the first control signal indicates a number of memory devices in the ready state among the plurality of memory devices and information identifying the memory devices.

5. The storage device of claim 4, wherein the first control signal indicates the number of memory devices in the ready state is 0 when no memory device is in the ready state among the plurality of memory devices.

6. The storage device of claim 4, wherein the first control signal, when more than one of the plurality of memory devices are in the ready state, comprises information identifying each of the memory devices in the ready state.

7. A storage device comprising:
a memory controller configured to transmit a first command and a second command; and
a memory package comprising:
a plurality of memory devices configured to output status data in response to the first command, and output error data indicating whether an error occurs in an internal configuration in response to the second command;
an interface circuit connected between the plurality of memory devices and the memory controller, and configured to receive the status data from the plurality of memory devices and output a plurality of status data to the memory controller; and
a package controller configured to generate a selection signal to control the interface circuit,
wherein the status data indicates whether a corresponding memory device is in a ready state or a busy state in which an internal operation is being performed,
wherein n is an integer greater than 1,
wherein the plurality of memory devices comprises n memory devices, and each of the plurality of memory devices comprises a status output pin and an error output pin, and wherein the interface circuit comprises n output pins and a first multiplexer configured to selectively connect the status output pin of each of the plurality of memory devices to the n output pins based on the selection signal and the first command, and connecting the error output pin of each of the plurality of memory devices and the n output pins based on the selection signal and the second command.

8. The storage device of claim 7,
wherein each of the plurality of memory devices comprises a plurality of data pins, and is configured to, in response to receiving a third command, output read data through the plurality of data pins,
wherein the interface circuit comprises a plurality of second selectors connected to n output pins and the plurality of data pins, and is configured to selectively connect the plurality of data pins to the n output pins based on a second selection signal, and
wherein the package controller is further configured to generate the second selection signal in response to the third command.

9. The storage device of claim 8,
wherein the interface circuit comprises the n output pins, and a third selector configured to receive the error data from each of the plurality of memory devices in response to the second command and output a plurality of error data through the n output pins based on the selection signal and the second command, and
wherein the package controller is further configured to generate the selection signal in response to the second command.

10. The storage device of claim 8, wherein the interface circuit further comprises a fourth selector connected between the plurality of second selectors and the n output pins, and configured to be controlled by a first control signal, and
wherein the first control signal indicates a number of memory devices in the ready state among the plurality of memory devices and information identifying the memory devices.

11. The storage device of claim 10, wherein the fourth selector is further configured to connect the n output pins and the plurality of second selectors in response to the second command.

12. An operating method of a storage device, comprising:
receiving, by each of a plurality of memory devices, a first command, from a memory controller;
outputting, by each of the plurality of memory devices, status data indicating whether a corresponding memory device is in a ready state or a busy state in which an internal operation is being performed, through a status output pin in response to receiving the first command;
generating a selection signal to control a plurality of selectors in an interface circuit to output the status data from each of the plurality of memory devices to the memory controller based on the first command;
receiving, by each of a plurality of memory devices, a second command, from a memory controller;
outputting, by each of the plurality of memory devices, error data through an error output pin in response to receiving the second command,
wherein the interface circuit includes n output pins,
wherein the plurality of selectors includes a plurality of status output pins, and a first multiplexer that is connected to the n output pins and is controlled by a first selection signal, and
wherein the generating the selection signal comprises generating the first selection signal to control the first multiplexer to connect the plurality of status output pins and the n output pins in response to the first command.

13. The operating method of the storage device of claim 12, further comprising:
receiving, from the memory controller, a second command requesting error data indicating whether an error occurs in an internal configuration of each of the plurality of memory devices.

14. The operating method of the storage device of claim 13, wherein the interface circuit includes a plurality of error output pins and the plurality of selectors includes a second selector that is connected to the n output pins and is controlled by a second selection signal, and
wherein the generating the selection signal comprises generating the second selection signal to connect the plurality of error output pins and the n output pins in response to the second command.

15. The operating method of the storage device of claim 13, further comprising:
receiving a third command requesting data in the plurality of memory devices from the memory controller; and
outputting, by each of the plurality of memory devices, read data through a plurality of data pins in response to receiving the third command.

16. The operating method of the storage device of claim 15, wherein the plurality of selectors includes a plurality of third selectors connected to the plurality of data pins and controlled by a second selection signal, and a fourth selector connected to the plurality of third selectors and the n output pins and controlled by a first control signal, and
wherein the generating the selection signal comprises generating the first control signal in response to the third command.

17. The operating method of the storage device of claim 16, wherein the generating the first control signal comprises inputting a number of memory devices in the ready state among the plurality of memory devices and information on the memory devices to the fourth selector in response to the first command.

\* \* \* \* \*